(12) United States Patent
Yoshida

(10) Patent No.: US 8,593,663 B2
(45) Date of Patent: Nov. 26, 2013

(54) IMAGE FORMING APPARATUS FOR STORING AND PROCESSING ELECTRONIC DOCUMENTS AND IMAGE DATA, DATA PROCESSING METHOD, AND STORAGE MEDIUM THEREOF

(75) Inventor: Toru Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/844,049

(22) Filed: Aug. 23, 2007

(65) Prior Publication Data

US 2008/0055661 A1 Mar. 6, 2008

(30) Foreign Application Priority Data

Aug. 31, 2006 (JP) .................................. 2006-235998

(51) Int. Cl.
*G06F 3/12* (2006.01)

(52) U.S. Cl.
USPC ....... 358/1.15; 358/1.13; 358/1.14; 358/1.16; 358/403; 707/E17.008; 707/17.001; 707/662

(58) Field of Classification Search
USPC ............. 358/1.14, 1.15, 1.16, 1.13, 402–404; 707/E17.008, E17.001, 662
See application file for complete search history.

(56) References Cited

U.S. PATENT DOCUMENTS

| | | | |
|---|---|---|---|
| 6,202,086 B1* | 3/2001 | Maruyama et al. | 709/206 |
| 2003/0145238 A1* | 7/2003 | Yokoyama | 713/202 |
| 2003/0179404 A1* | 9/2003 | Matsueda | 358/1.15 |
| 2004/0012812 A1* | 1/2004 | Shimizu | 358/1.15 |
| 2004/0156066 A1* | 8/2004 | Mishima et al. | 358/1.13 |
| 2006/0044601 A1* | 3/2006 | Misawa et al. | 358/1.15 |
| 2006/0132833 A1* | 6/2006 | Terabe et al. | 358/1.15 |
| 2007/0008584 A1* | 1/2007 | Kawabuchi et al. | 358/1.15 |
| 2010/0017803 A1* | 1/2010 | Shibuya | 718/100 |

FOREIGN PATENT DOCUMENTS

| | | | |
|---|---|---|---|
| JP | 10-145493 A | | 5/1998 |
| JP | 2001197319 A | * | 7/2001 |
| JP | 2004-227476 A | | 8/2004 |

* cited by examiner

*Primary Examiner* — Jacky X Zheng

(74) *Attorney, Agent, or Firm* — Canon USA Inc. IP Division

(57) ABSTRACT

An image forming apparatus executes functional processing according to specific functional processing information stored in a storage unit. The image forming apparatus determines whether any data remains in the storage unit when new functional processing information is set. The image forming apparatus prevents the specific functional processing information stored in the storage unit from being updated based on the new functional processing information if any data remains in the storage unit, and replaces the specific functional processing information stored in the storage unit with the new functional processing information if no data remains in the storage unit.

15 Claims, 20 Drawing Sheets

FIG.8

TIMING: AT PREDETERMINED TIME
SETTING: FRIDAY 17:00:00

PROCESSING CONTENTS: MAIL TRANSMISSION
ADDRESS: aaa@bbb.cc.co.jp
SUBJECT: [yyymmdd] WEEKLY REPORT
SENDER: xxx@yyy.zz.co.jp

FIG.13

| DOCUMENT ID 1301 | DOCUMENT NAME 1302 | BOX ID OF STORAGE DESTINATION 1303 | OWNER USER ID 1304 | UPDATE DATE/TIME 1305 |
|---|---|---|---|---|
| D0001 | DOCUMENT 1 | B1001 | U1110 | 2006/05/21 |
| D0002 | DOCUMENT 2 | B1002 | U1111 | 2006/03/15 |
| D0003 | DOCUMENT 3 | B1004 | U1112 | 2006/05/21 |
| D0004 | DOCUMENT 4 | B1004 | U1113 | 2006/04/14 |

TAB1

FIG.19

FD/CD-ROM OR COMPARABLE STORAGE MEDIUM

| DIRECTORY INFORMATION |
|---|
| PROGRAM CODE CORRESPONDING TO STEPS IN FLOWCHART OF FIG. 9 |
| PROGRAM CODE CORRESPONDING TO STEPS IN FLOWCHART OF FIG. 12 |
| PROGRAM CODE CORRESPONDING TO STEPS IN FLOWCHART OF FIG. 17 |
| PROGRAM CODE CORRESPONDING TO STEPS IN FLOWCHART OF FIG. 18 |

IMAGE FORMING APPARATUS FOR STORING AND PROCESSING ELECTRONIC DOCUMENTS AND IMAGE DATA, DATA PROCESSING METHOD, AND STORAGE MEDIUM THEREOF

BACKGROUND OF THE INVENTION

1. Field of the Invention

The present invention relates to an image processing apparatus, a terminal apparatus, and an image processing system. More specifically, the present invention relates to an image processing apparatus capable of performing a box function to store and process electronic documents and image data.

2. Description of the Related Art

An image forming apparatus (e.g., printer, facsimile apparatus, copying machine, and multifunction peripheral), when connected to a network, can possess a box function for storing a document into a box area (storage unit), for example, from a hard disk.

For example, a message (e.g., facsimile) store and forward switching apparatus discussed in Japanese Patent Application Laid-Open No. 10-145493 sets storage areas of programs for respective boxes. The programs are automatically executed by a message processing device immediately before/after performing message registration processing and immediately before/after outputting the message.

The following processing can be automatically executed according to the programs.

The first processing includes deleting all messages remaining in a box, registering a new message into a box, and generating a reception notice to a facsimile machine of a box owner.

The second processing includes transmitting any news/information from an administrator before the message is output from the box. The third processing includes transmitting a delivery notification to a message sender when the message is output from the box. The fourth processing includes converting the message output from the box into a data format that a message recipient can process.

Exemplary processing discussed in Japanese Patent Application Laid-Open No. 2004-227476 includes setting details of document processing for changing the contents of a document in a box and automatically executing the document processing on the document stored in the box when predetermined execution conditions are satisfied.

The processing being automatically executed is, for example, changes/modifications on document creation date, document file name, issue division, acknowledgment field, and document number.

There are four execution conditions. The first execution condition is reception of documents from a predetermined transmitter.

The second execution condition is registration of a predetermined number of box documents. The third execution condition is completion of document content change processing performed on the box documents. The fourth execution condition is elapse of a predetermined setting time.

However, when any processing is performed on a box document, the above-described conventional technique does not check whether the processing to be executed is acknowledged by an owner user of the box.

For example, after document 1 of user A is stored in a box, the contents of the box execution processing may change without permission of the user A. The document 1 may be subjected to the processing not requested or recognized by the user A.

Namely, the conventional techniques deal with the method for easily processing documents within the box, however, are unable to prevent a box document from being modified which an owner user of this document does not request or recognize.

Therefore, the conventional techniques cannot assure a satisfactory security protection for the box document.

The image forming apparatus has similar problems if its storage unit can store other data, such as image, electronic data, print job, and scan job.

SUMMARY OF THE INVENTION

Exemplary embodiments of the present invention are directed to an image forming apparatus capable of preventing specific functional processing settings from being updated without permission of a user if any data remains in a storage unit, thereby satisfying both an information storage request and a security protection request.

According to an aspect of the present invention, an image forming apparatus is configured to execute functional processing according to specific functional processing information based on an event stored in a storage unit. The image forming apparatus includes a setting unit configured to set new functional processing information that is to replace the specific functional processing information stored in the storage unit; a determination unit configured to determine whether any data remains in the storage unit that stores the specific functional processing information when the setting unit sets the new functional processing information; and an updating unit configured to prevent the specific functional processing information stored in the storage unit from being updated based on the new functional processing information if the determination unit determines that any data remains in the storage unit, and replace the specific functional processing information stored in the storage unit with the new functional processing information if the determination unit determines that no data remains in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 8 illustrates an exemplary box document processing setting file that can be applied to a box document of the image forming apparatus according to the present embodiment.

FIG. 13 illustrates a document data management table managed in box document information illustrated in FIG. 2B.

FIG. 19 illustrates a memory map of a storage medium that stores various data processing programs, which are readable by the image forming apparatus of the present invention.

DETAILED DESCRIPTION OF THE EMBODIMENTS

Figure 1:
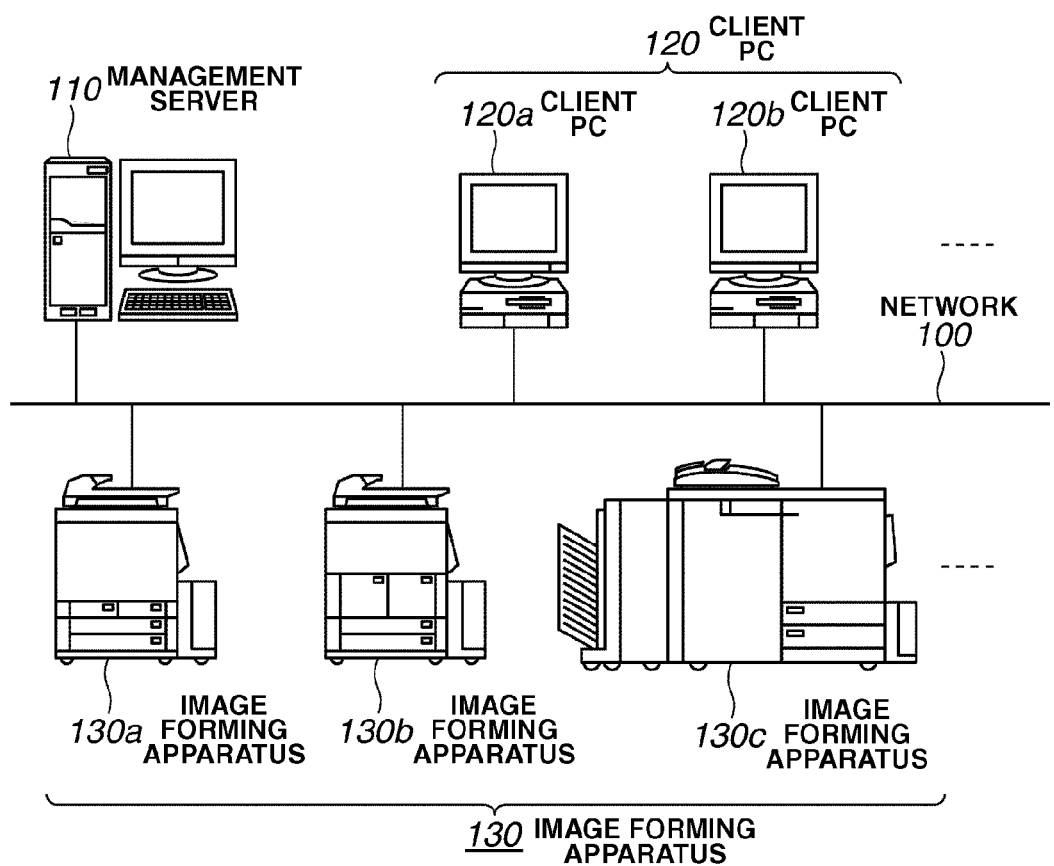
FIG. 1 illustrates an image forming system including an image forming apparatus according to a first exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus, once an item is described in one figure, it may not be discussed for following figures. Exemplary embodiments will be described in detail below with reference to the drawings.

First Exemplary Embodiment

FIG. 1 illustrates an image forming system including an image forming apparatus according to a first exemplary embodiment of the present invention. Plural image forming apparatuses 130a to 130c (collectively referred to as image forming apparatus 130), each including a box document processing function, can communicate with each other via a network 100 according to a predetermined protocol. In the present specification, the term "box" is used to describe a storage unit capable of storing information. The image forming apparatus 130 can manage one or more boxes and can execute functional processing according to specific functional processing information based on an event being set (e.g., "transmit information stored in a box to A Corporation at 10 AM every Tuesday"). In the present embodiment, "information" includes electronic data, document, image, print job, scan job, facsimile job, or the like.

The system includes plural client personal computers (PCs) 120a and 120b (collectively referred to as client PC 120) which can be operated by end users and a management server 110 which sets processing contents of a box document processing function. The management server 110, the client PC 120, and the image forming apparatus 130 can communicate with each other via the network 100.

The image forming apparatus 130 is capable of executing a box function for storing a document in a hard disk or other storage medium. The image forming apparatus 130 has a box document processing function for executing predetermined processing on the stored document.

The management server 110 can set processing contents of the box document processing function with a dedicated application. The management server 110 can execute settings for a box of each image forming apparatus. Alternatively, a similar program capable of performing settings of the box document processing function can be installed on a PC of an administrator instead of the management server 110. In an embodiment, an administrative user can use a dedicated application that causes the management server 110 to perform the settings.

The client PC 120 is a general PC that can be operated by an end user. The client PC 120 includes a central processing unit (CPU), a read only memory (ROM), and a random access memory (RAM) which can function as a control unit. The client PC 120 has a network communication function for communicating with an external device via the network 100, and an input/output processing function for inputting/outputting data or information to/from an external device via an input/output device.

An operating system (OS) is installed on the client PC 120. The client PC 120 can install and execute an application program managed by the OS.

A printer driver or comparable application, running on the client PC 120, can function as a unit configured to store a document into a box (i.e., storage area provided in the hard disk) of the image forming apparatus 130. The CPU, when executing this application, can store a document into an arbitrary box in the hard disk. A scanner function or a document reception function of the image forming apparatus can also be used to store a document into a box.

Figure 2A:
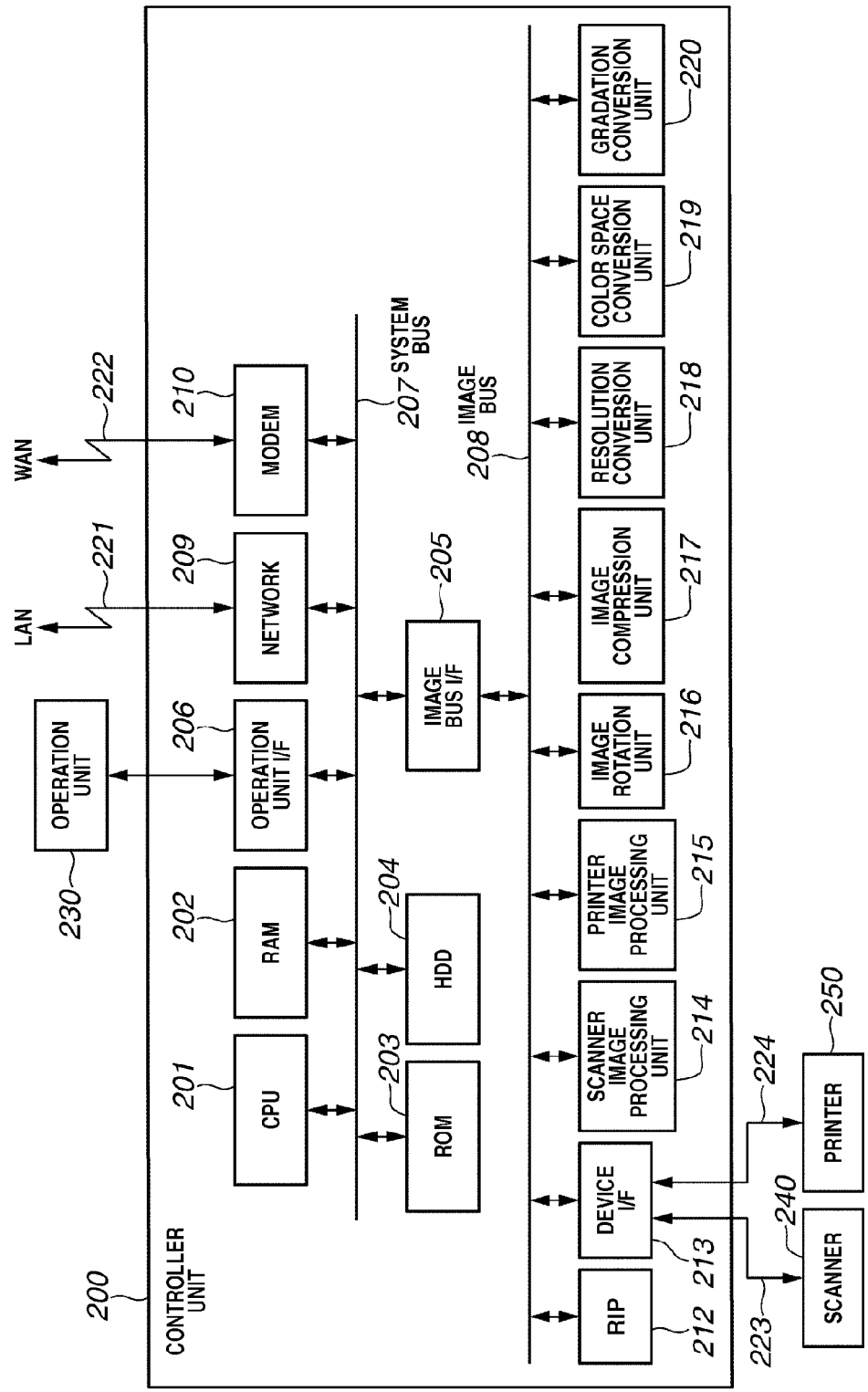
FIG. 2A is a block diagram illustrating a hardware configuration of the image forming apparatus illustrated in FIG. 1.

FIG. 2A is a block diagram illustrating a hardware configuration of the image forming apparatus 130 illustrated in FIG. 1. The image forming apparatus 130 includes a controller unit (CU) 200 that is associated with a scanner 240 functioning as an image input device and a printer 250 functioning as an image output device. The CU 200 can input/output image information and device information via a local area network (LAN) 221 or a wide area network (WAN) 222.

The CPU 201 is a controller that controls the system. The RAM 202 is a system work memory with which the CPU 201 can operate and is also an image memory that temporarily stores image data. The ROM 203 is a boot ROM that stores a boot program for the system.

A hard disk drive (HDD) 204 stores system software and image data. The HDD 204 is a storage unit including box areas configured to store document and image data for each user or each group.

An automatic execution program installed on the management server 110 has a function of rewriting document data stored in each box area.

An operation unit interface (I/F) 206 outputs image data to an operation unit (UI) 230 that displays the image data. The operation unit I/F 206 receives the information input by a system operator via the operation unit 230 and sends the information to the CPU 201.

A network unit 209 performs information input/output processing via the LAN 221 according to a predetermined protocol. A modem 210 inputs or outputs image information via the WAN 222. The CPU 201, the RAM 202, the ROM 203, the HDD 204, an image bus I/F 205, the network unit 209, and the modem 210 are connected with each other via a system bus 207.

The image bus I/F 205 functions as a bus bridge between the system bus 207 and an image bus 208 that can speedily transfer image data. For example, the image bus 208 is a peripheral component interconnect (PCI) bus or Institute of Electrical and Electronic Engineers (IEEE) 1394 which can transfer image data at a high speed.

The following devices are connected via the image bus 208. A raster image processor (RIP) 212 rasterizes a page description language (PDL) code into a bitmap image.

A device I/F unit 213 performs synchronous/asynchronous conversion processing on image data between the controller 200 and an image input/output device (i.e., the scanner 240 and the printer 250).

A scanner image processing unit 214 performs correction, modification, and editing processing on input image data. Furthermore, the scanner image processing unit 214 determines whether an input image is a color document or a monochrome document based on a saturation signal of the image, and holds the determination result. A printer image processing unit 215 performs correction, modification, and editing processing on print image data (output image data).

An image rotation unit 216 rotates image data read by the scanner 240 in association with the scanner image processing, and stores the rotated data in the memory. Furthermore, the image rotation unit 216 rotates image data stored in the memory. Moreover, the image rotation unit 216 can rotate the image data to cause the printer image processing unit 215 to output print data being rotated.

A resolution conversion unit 218 performs resolution conversion processing on image data stored in the memory and stores the processed data on the memory. A color space conversion unit 219 converts, for example, YUV image data into Lab image data based on a matrix calculation and stores the converted data in the memory. A gradation conversion unit 220 converts, for example, 8-bit, 256-gradation image data stored on the memory into 1-bit, 2-gradation image data based on error diffusion processing and stores the converted data in the memory.

An image compression unit 217 performs Joint Photographic Experts Group (JPEG) compression/expansion processing on multivalued image data and performs Joint Bi-level Image Experts Group (JBIG), Modified Modified Read (MMR), Modified Read (MR), or Modified Huffman (MH) compression/expansion processing on binary image data.

The image rotation unit 216, the resolution conversion unit 218, the color space conversion unit 219, the gradation conversion unit 220, and the image compression unit 217 can perform a cooperative operation. For example, these units can cooperatively perform image rotation and resolution conversion processing on image data stored in the memory.

Figure 2B:
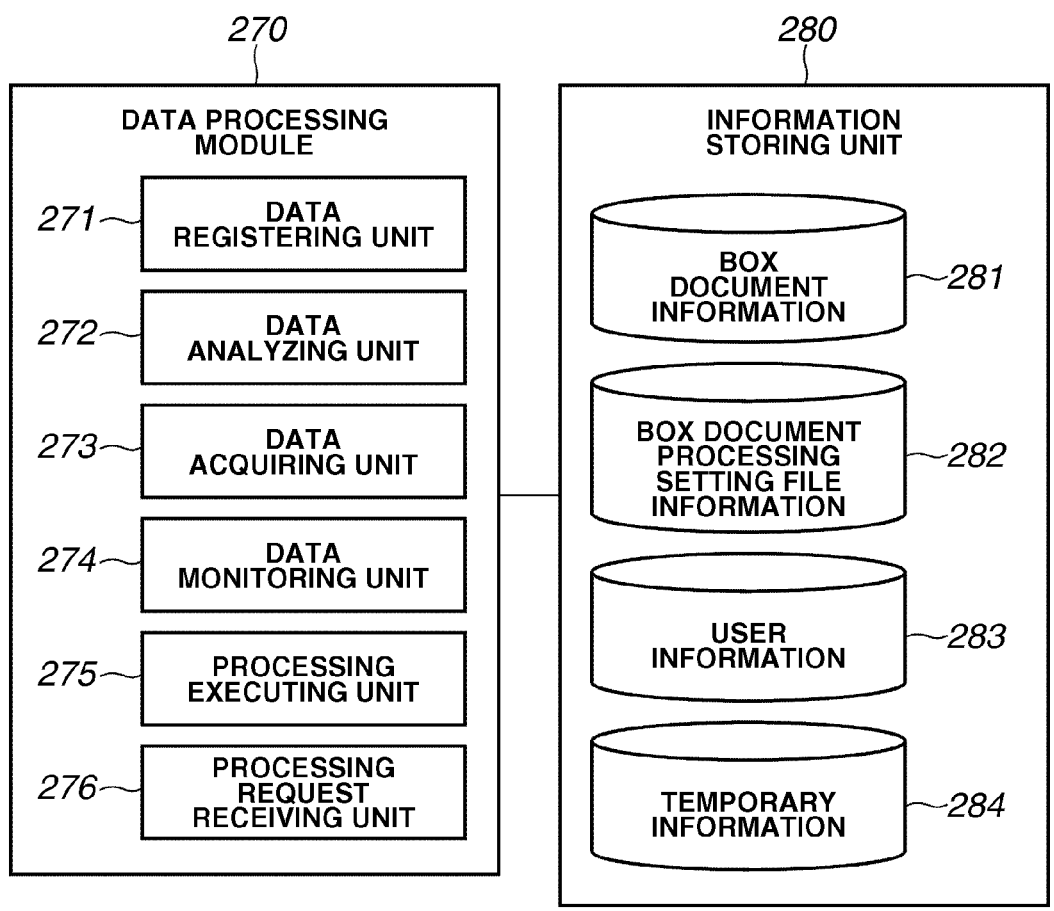
FIG. 2B is a block diagram illustrating a box processing software configuration executed in the image forming apparatus illustrated in FIG. 1.

FIG. 2B is a block diagram illustrating a box processing software configuration executed in the image forming apparatus 130 illustrated in FIG. 1. The software programs described below are stored in the HDD 204 and loaded into the RAM 202 when the CPU 201 executes various box processing functions.

The box processing software illustrated in FIG. 2B includes a data processing module 270 and an information storing unit 280.

The data processing module 270 includes a data registering unit 271 configured to register data to the information storing unit 280, a data analyzing unit 272 configured to analyze data, a data acquiring unit 273 configured to acquire data from the information storing unit 280, a data monitoring unit 274 configured to monitor data stored in the information storing unit 280, a processing executing unit 275 configured to perform data processing (e.g., notification processing, move/delete processing, etc), and a processing request receiving unit 276 configured to receive a processing request from an external device.

The information storing unit 280 manages box document information 281 (i.e., information relating to a box or a document stored in a box), box document processing setting file information 282 (i.e., information relating to a box document processing setting file), user information 283 (i.e., information relating to a user), and temporary information 284 (i.e., temporarily stored information).

The temporary information 284 temporarily stores new functional processing information which replaces the specific functional processing information stored in the storage unit (box) which can be set by an authorized user. For example, as the specific functional processing information, data stored in a box is transmitted to B Corporation every Tuesday at 10 AM, which corresponds to description in the above-described box document processing setting file.

In the present example, the specific functional processing information stored in a box is "transmitting the data stored in the box to A corporation every Wednesday at 10 AM."

If the specific functional processing information stored in a box is freely changeable by an authorized user, confidential data/information may be delivered to a third person. To solve this problem, if new functional processing information is applied to the storage unit, the present embodiment determines whether any data (e.g., box document) remains in the storage unit that stores the specific functional processing information. If the data monitoring unit 274 determines that the storage unit stores the data, the temporary information 284 holds the new functional processing information until all data is completely deleted from the storage unit or moved to other storage unit. Then, if it is determined that the storage unit stores no data, the data registering unit 271 replaces the specific functional processing information stored in the storage unit with the new functional processing information (i.e., information held in the temporary information 284). An exemplary embodiment is described below.

Figure 3:
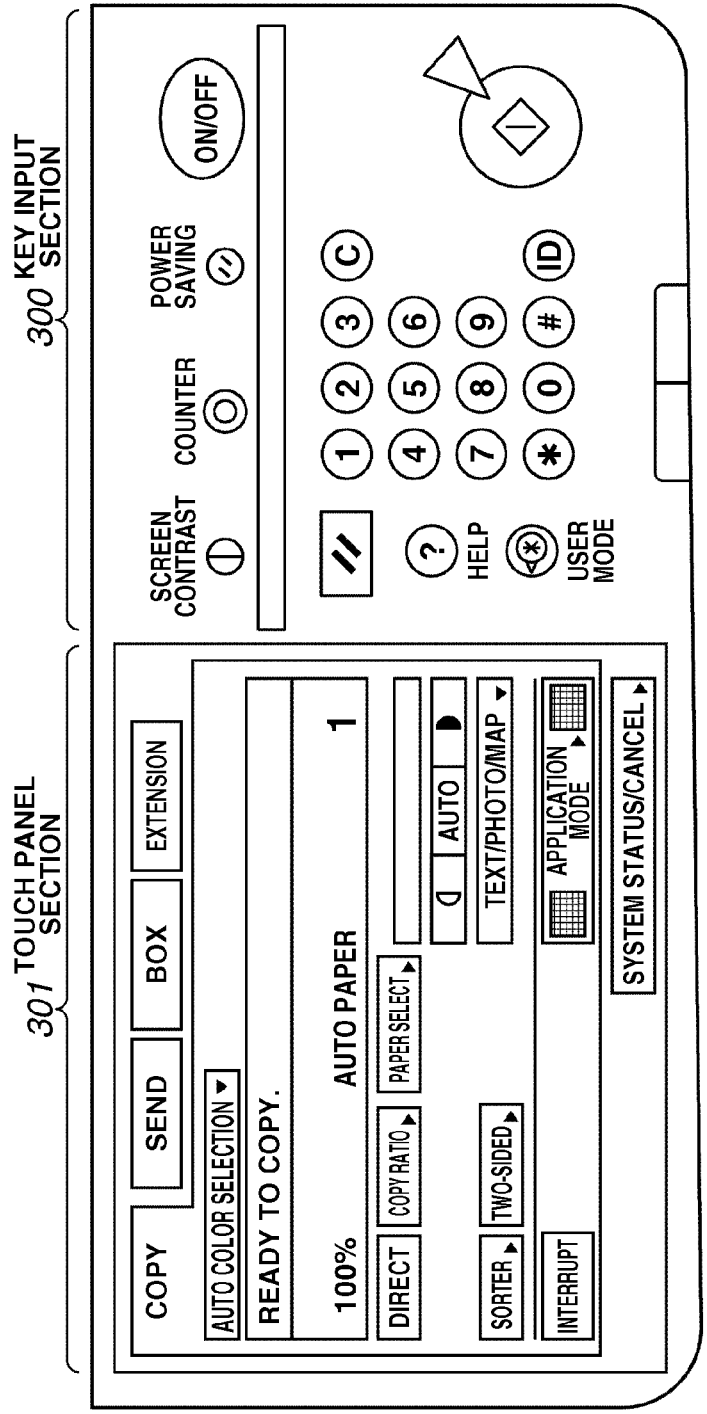
FIG. 3 is a plan view illustrating an exemplary configuration of an operation unit illustrated in FIG. 2A.

FIG. 3 is a plan view illustrating an exemplary configuration of the operation unit 230 illustrated in FIG. 2A. The operation unit 230 includes a key input section 300 and a touch panel section 301.

Figure 4:
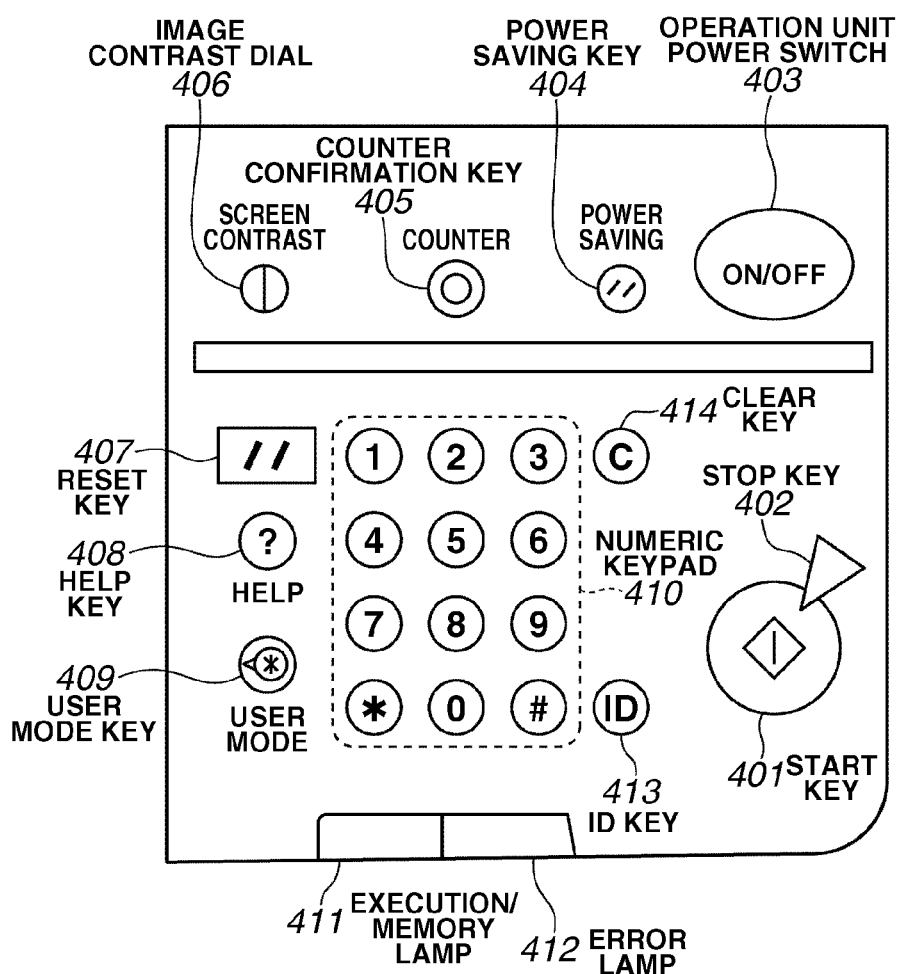
FIG. 4 is a plan view illustrating details of a key input section illustrated in FIG. 3.

FIG. 4 is a plan view illustrating details of the key input section 300 illustrated in FIG. 3.

Figure 5:
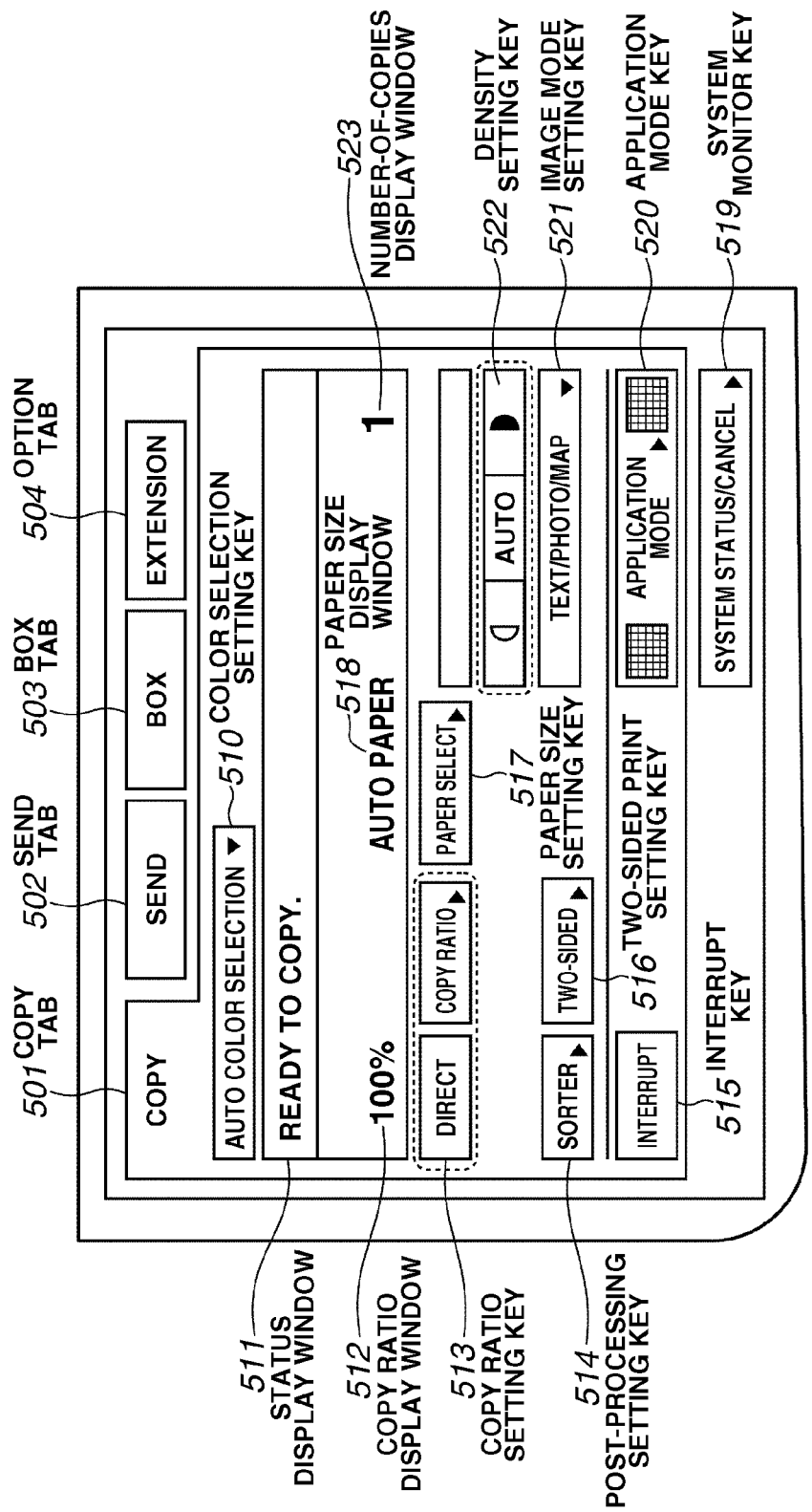
FIG. 5 is a plan view illustrating details of a touch panel section illustrated in FIG. 3.

FIG. 5 is a plan view illustrating details of the touch panel section 301 illustrated in FIG. 3.

The key input section 300 enables a user to perform ordinary operation settings.

In FIG. 4, an operation unit power switch 403 enables a user to select a standby mode or a sleep mode when a main power switch of the image forming apparatus 130 is in an ON state.

In the standby mode, the system can perform ordinary operations. In the sleep mode, a main controller stops running programs and brings the image forming apparatus 130 into a waiting state ready for accepting any interrupt processing such as network printing or facsimile reception. Electric power consumption decreases in the sleep mode.

A power saving key 404 enables a user to reduce power consumption. If a user presses this key 404, a fixing unit operates at a low temperature, however, a print operation starts after passage of a relatively long time. If a power saving rate is variable, the control temperature can be reduced to a desired level.

A start key 401 enables a user to instruct initiating a copy operation or a transmission operation. A stop key 402 enables a user to stop the operation. A numeric keypad 410 enables a user to input numerical data for various settings. A clear key 414 enables a user to cancel the numerical data having been input. An ID key 413 enables a user to input a password when the image forming apparatus 130 requires authentication of an operator.

A reset key 407 enables a user to cancel the present settings and select default settings. A help key 408 enables a user to display a guidance tab or a help window. A user mode key 409 enables a user to display a system setting screen dedicated to each user.

A counter confirmation key 405 enables a user to display the number of prints made which may be counted by a counter provided in the image forming apparatus.

In the present embodiment, the counter confirmation key 405 can display the number of prints made for each mode, such as operation mode (e.g., copy/print/scan/facsimile), color mode (e.g., color/monochrome), and sheet size (e.g., large/small).

An image contrast dial 406 enables a user to adjust brightness of a liquid crystal display of the touch panel section 301 and control the viewability.

An execution/memory lamp 411 blinks during execution of a job or access to a memory.

An error lamp 412 blinks in case of a failure in execution of a job, or when a serviceman call or an operator call is required to notify paper jam or a shortage of supplies.

As illustrated in FIG. 5, the touch panel section 301 includes a liquid crystal display (LCD) and a touch panel display. The touch panel display is composed of transparent electrodes located on the LCD. If a user touches a transparent electrode (which is equivalent to a key of the LCD), the touch panel section 301, for example, displays another operation screen according to a programmed control procedure.

The touch panel section 301 can display various operation screens in response to each setting operation by a user, although the screen illustrated in FIG. 5 is an initial screen for the standby mode.

When a copy tab 501 is pressed, the touch panel section 301 displays a copy operation screen. When a send tab 502 is pressed, the touch panel section 301 displays an operation screen that enables a user to instruct a transmission (send) operation, such as transmission of a facsimile or an e-mail.

When a box tab 503 is pressed, the touch panel section 301 displays an input/output operation screen that enables a user to input or output a job to or from a box (i.e., a job storage unit provided for each user). The job storage unit is a storage area in the HDD 204 illustrated in FIG. 2A.

When an option tab 504 is pressed, the touch panel section 301 displays an optional operation screen that enables scanner settings or other functional settings. When a system monitor key 519 is pressed, the touch panel section 301 displays the present status of the image forming apparatus. If a user selects one of the tabs, the image forming apparatus 130 shifts to a selected operation mode.

A color selection setting key 510 enables a user to select one of color copy, monochrome copy, and automatic selection. When a copy ratio setting key 513 is pressed, the touch panel section 301 displays a copy ratio setting screen that enables a user to select a desirable copy ratio which may be "direct" or any other scaling ratio.

When a post-processing setting key 514 is pressed, the touch panel section 301 displays a post-processing setting screen that enables a user to input settings (number, position, etc) for staple or punch processing. When a two-sided print setting key 516 is pressed, the touch panel section 301 displays a two-sided print setting screen that enables a user to select one-sided print or two-sided print.

When a sheet size setting key 517 is pressed, the touch panel section 301 displays a sheet size setting screen that enables a user to designate a sheet cassette, a sheet size, and a media type. An image mode setting key 521 enables a user to select a desirable document image mode among a character mode, a photo mode, and a map mode.

A concentration setting key 522 enables a user to adjust the concentration of an output image.

A status display window 511 realizes a simplified display for a standby state, a warming-up state, a jam state, and an error. A copy ratio display window 512 displays a copy ratio set by a user using the copy ratio setting key 513.

A sheet size display window 518 displays a sheet size or a mode when selected by a user with the sheet size setting key 517. A number-of-prints display window 523 displays the number of prints when designated by a user with the numeric keypad 410 or displays a page/sheet number of a currently printed sheet.

An interrupt key 515 enables a user to instruct an interrupt job during a copy operation. When an application mode key 520 is pressed, the touch panel section 301 displays an application mode screen that enables a user to perform various image processing and layout settings including continuous copy of pages, cover (slip)/interleaf setting, reduction of layout, and move of image.

Figure 6:
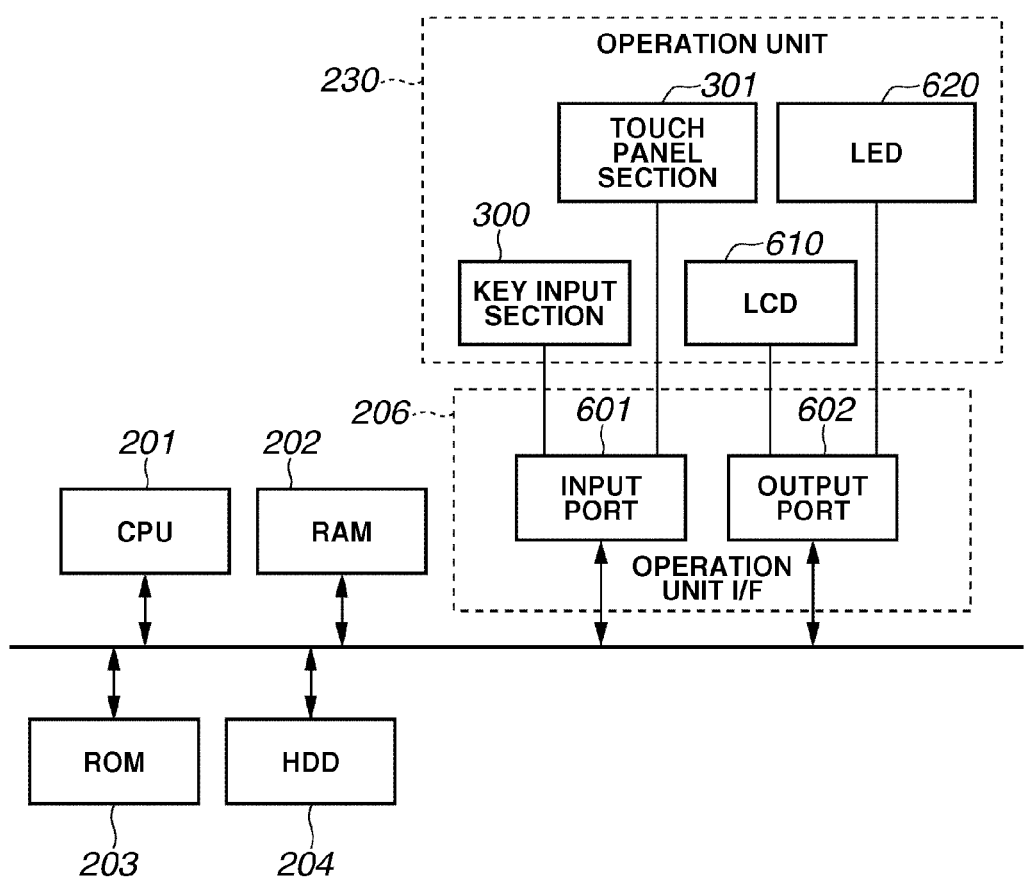
FIG. 6 is a block diagram illustrating an exemplary control configuration for an operation unit in the image forming apparatus illustrated in FIG. 1.

FIG. 6 is a block diagram illustrating an exemplary control configuration for the operation unit 230 in the image forming apparatus 130 illustrated in FIG. 1. Components similar to those illustrated in FIG. 2A are denoted by the same reference numerals.

The image forming apparatus illustrated in FIG. 6 includes the CPU 201 that controls access of each device connected to the system bus 207 based on a control program stored in the ROM 203.

The CPU 201 inputs image information from the scanner 240 via an image input unit interface 223, and outputs an image signal (output information) to the printer 250 via a print unit interface 224.

The RAM 202 functions as a main memory or a work area of the CPU 201. When a user inputs instruction/data via the touch panel section 301 or the key input section 300, the CPU 201 receives the operation contents (i.e., input instruction/data) via an input port 601.

The CPU 201 generates display screen data based on the obtained operation contents and the control program. Then, the CPU 201 outputs display screen data to a screen output device 610 (e.g., LCD or cathode ray tube (CRT)) via an output port 602 that functions as a device controller 620 is LED (Light Emitting Diode) which indicates status of the image forming apparatus.

Figure 7:
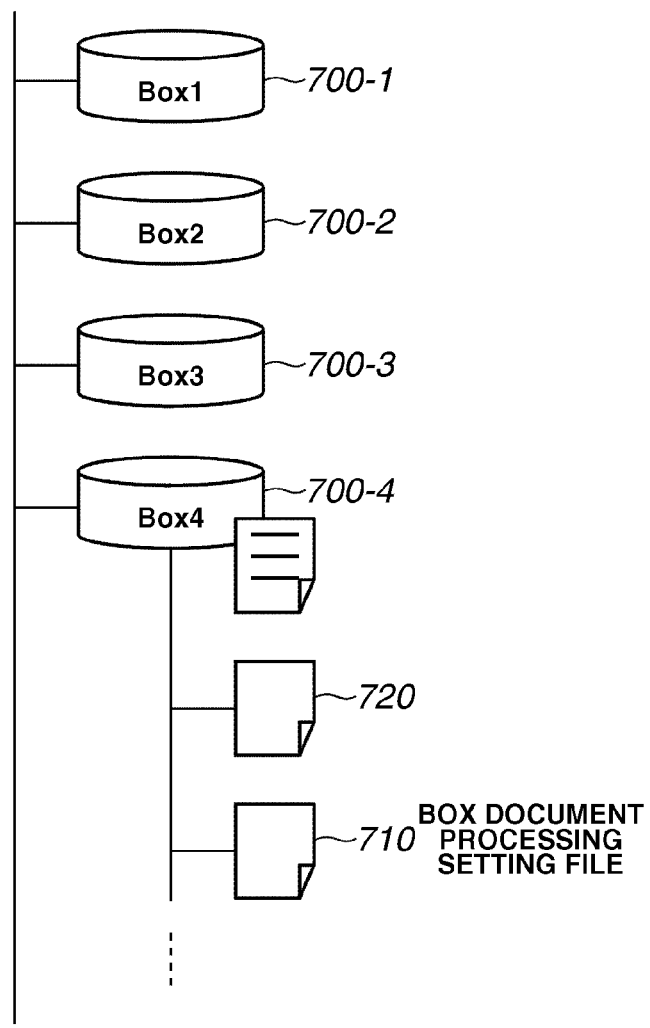
FIG. 7 illustrates box information stored in a hard disk drive (HDD) of the image forming apparatus illustrated in FIG. 1.

FIG. 7 illustrates box information stored in the HDD 204 of the image forming apparatus 130 illustrated in FIG. 1.

As illustrated in FIG. 7, the image forming apparatus 130 includes a plurality of boxes 700-1 to 700-4 configured to store a plurality of documents 720.

The boxes 700-1 to 700-4 are configured to store a box document processing setting file 710 in addition to the documents. The box document processing setting file 710 includes description (definition) of the processing performed according to the box document processing function. The box document processing setting file 710 includes information relating to the execution timing of the processing and detailed contents of the processing.

In an embodiment, the processing executing unit 275 can set processing execution timing TM1 through TM10.

At timing TM1, the image forming apparatus 103 receives a document via the network.

At timing TM2, the image forming apparatus 103 deletes a document in a box. At timing TM3, a predetermined time has passed since a document is stored in a box.

Timing TM4 is equal to the date/time being set for a box. At timing TM5, the image forming apparatus 103 receives a predetermined instruction. At timing TM6, the image forming apparatus 103 prints a document. At timing TM7, the image forming apparatus 103 edits a document. At timing TM8, a user logs in the image forming apparatus 103. At timing TM9, the image forming apparatus 103 receives an electronic mail. At timing TM10, the image forming apparatus 103 receives a facsimile.

The processing executing unit 275 can set processing contents EX1 through EX8, as exemplary contents of the processing (i.e., event).

The processing content EX1 is printing a box document. The processing content EX2 is sending a box document as an e-mail (with/without attachment) to a designated address. The processing content EX3 is editing a box document. The processing content EX4 is deleting a box document. The processing content EX5 is newly generating a document to be stored in a box. The processing content EX6 is moving a document from a box to other box. The processing content EX7 is copying a box document. The processing content EX8 is extracting a document from a box according to a predetermined procedure (application).

FIG. 8 illustrates an exemplary box document processing setting file that can be applied to a box document of the image forming apparatus according to an embodiment.

The setting file illustrated in FIG. 8 includes description (definition) of processing contents, according to which a box document is attached to a mail transmitted to a designated address "aaaa@bbb.cc.co.jp" every Friday at 17:00:00.

The mail has a subject "[yyymmdd] WEEKLY REPORT" including the date/time of transmission. A mail sender is "xxx@yyy.zz.co.jp."

The CPU 201 executes the above-described processing at predetermined timing for a box in the HDD 204 to which the above-described setting file is applied. When the processing has been completed, the CPU 201 deletes a processed box document or moves the document to other box.

Although not described in detail, each box in the HDD 204 may include one or more folders configured to realize a hierarchical data structure.

If a hierarchical folder structure is available, a box document processing setting file can be provided for each folder. The CPU 201 can execute processing for each document in the folder. The CPU 201 can also execute processing for a document in a sub-folder.

If a box document processing setting file is present in a box, the CPU 201 can execute the processing for documents in all folders in the box.

Figure 9:
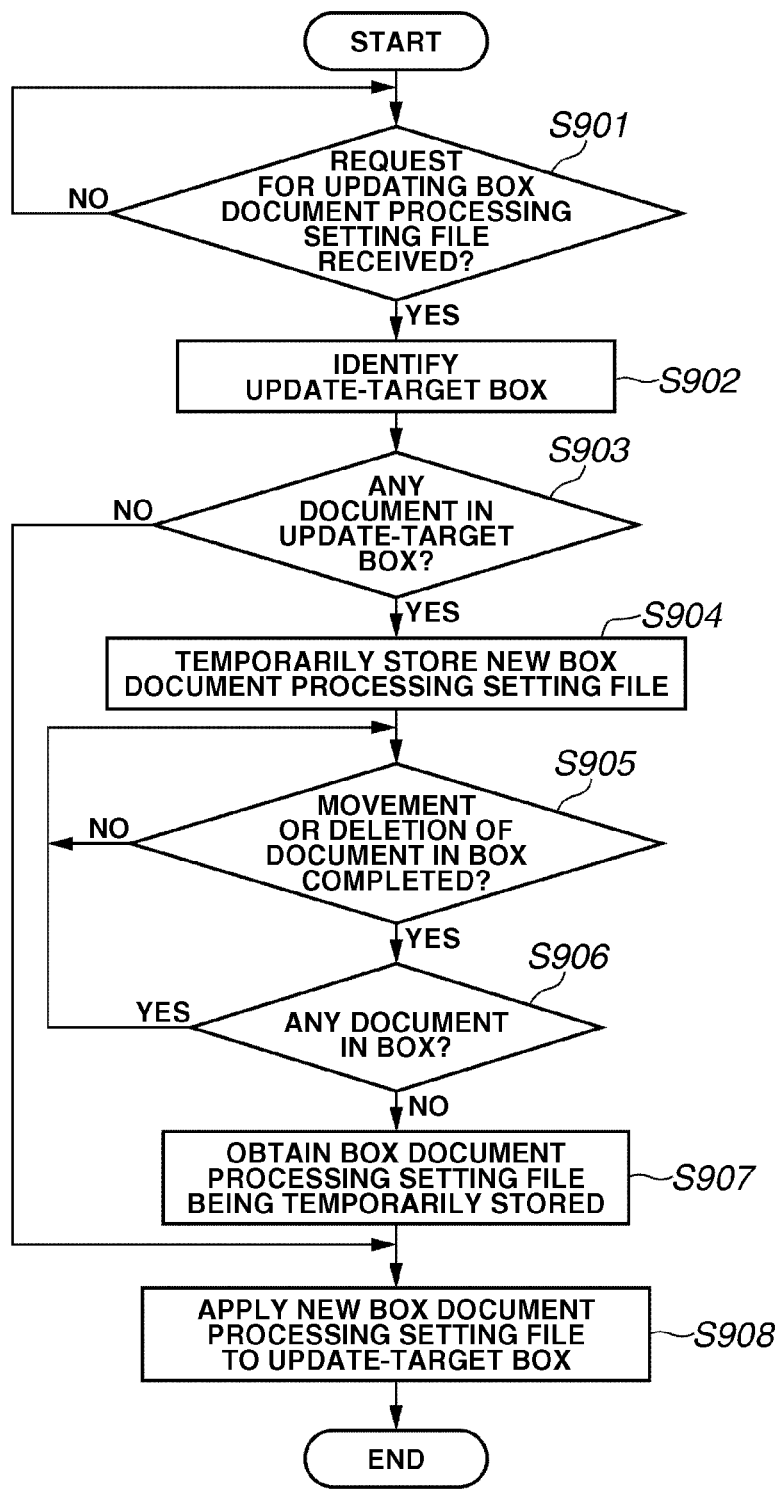
FIG. 9 is a flowchart illustrating an exemplary data processing procedure for the image forming apparatus of the present embodiment.

FIG. 9 is a flowchart illustrating an exemplary data processing procedure for the image forming apparatus according to an embodiment. The exemplary processing illustrated in FIG. 9 is for updating a box document processing setting file that can be set for a box in the HDD 204. The processing of each step can be realized by the CPU 201 that executes a control program loaded into the RAM 202 from the ROM 203 or the HDD 204, or downloaded from a host apparatus (not illustrated). The control program is, for example, the program module illustrated in FIG. 2B.

In an embodiment, it is presumed that a document A of user A and a document B of user B are input via the client PC 120 and stored in a box (box 700-4) of the image forming apparatus 130.

Furthermore, it is presumed that the box document processing setting file 710 having the processing contents described in FIG. 8 is already stored in the box 700-4 prior to the storage of the document A and the document B.

When the administrative user C inputs an update request of the box document processing setting file 710 via the management server 110 to store a new box document processing setting file in the box 700-4 via the network 100, the image forming apparatus 130 performs the following processing.

First, in step S901, the processing request receiving unit 276 of the data processing module 270 performs monitoring to determine whether an external device has requested updating the box document processing setting file. If an update request is input from the administrative user C via the management server 110 to set a new box document processing setting file to the box 700-4, the processing flow proceeds to step S902.

In step S902, the data analyzing unit 272 identifies a target box to be updated (i.e., an update-target box). In the present example, the update-target box is the box 700-4. Then, in step S903, the data acquiring unit 273 determines whether any document is present in the box 700-4.

As the box 700-4 stores the document A of user A and the document B of user B, the determination result in step S903 is YES and the processing flow proceeds to step S904.

In step S904, the data registering unit 271 temporarily stores a new box document processing setting file (i.e., the file received together with the update request) into the temporary information 284 of the information storing unit 280 illustrated in FIG. 2B. Then, the image forming apparatus 130 brings the box 700-4 into a waiting state until the processing for updating the box document processing setting file completes. In step S905, the data monitoring unit 274 performs monitoring to determine whether the document in the box 700-4 has been moved or deleted.

If the data monitoring unit 274 detects a move/delete of the document, the processing flow proceeds to step S906. In step S906, the data acquiring unit 273 determines whether any other document remains in the update-target box (i.e., box 700-4). If it is determined that any other document remains in the box (YES in step S906), the processing flow returns to step S905 to repeatedly execute the above-described processing.

If it is determined that no document is present in the update-target box (NO in step S906), the processing flow proceeds to step S907. In S907, the data acquiring unit 273 obtains the new box document processing setting file (i.e., file temporarily stored in step S904) from the temporary information 284. In step S908, the data registering unit 271 stores the new box document processing setting file (i.e., the file having been received together with the update request) into the box 700-4.

Then, the image forming apparatus 130 brings the box 700-4 into an ordinary state from the waiting state so that a new document can be stored in the box 700-4.

If it is determined that no document is present in the update-target box (NO in step S903), the processing flow directly proceeds to step S908. In step S908, the image forming apparatus 130 applies the new box document processing setting file to the update-target box and terminates the processing of this routine.

As described above, if there is any document remaining in an update-target box, the image forming apparatus 130 does not immediately replace the box document processing setting file with a new file when an update request is received. The image forming apparatus 130 updates the definition of the setting file after all documents in the update-target box has been moved or deleted.

Thus, if there is any document remaining in the update-target box, an embodiment can prevent the box document from being subjected to any processing that is not requested or recognized by a user of this document.

A user may access the box 700-4 (i.e., update-target box) when any document remains in the box 700-4 (i.e., YES in step S903) and when the box 700-4 is in a waiting state for the update processing of the file definition.

In general, a user accesses the box 700-4 with the touch panel of the image forming apparatus 130. Alternatively, if a software application, such as a printer driver, is installed on the client PC 120, the application may enable a user to access the box 700-4.

Figure 10:
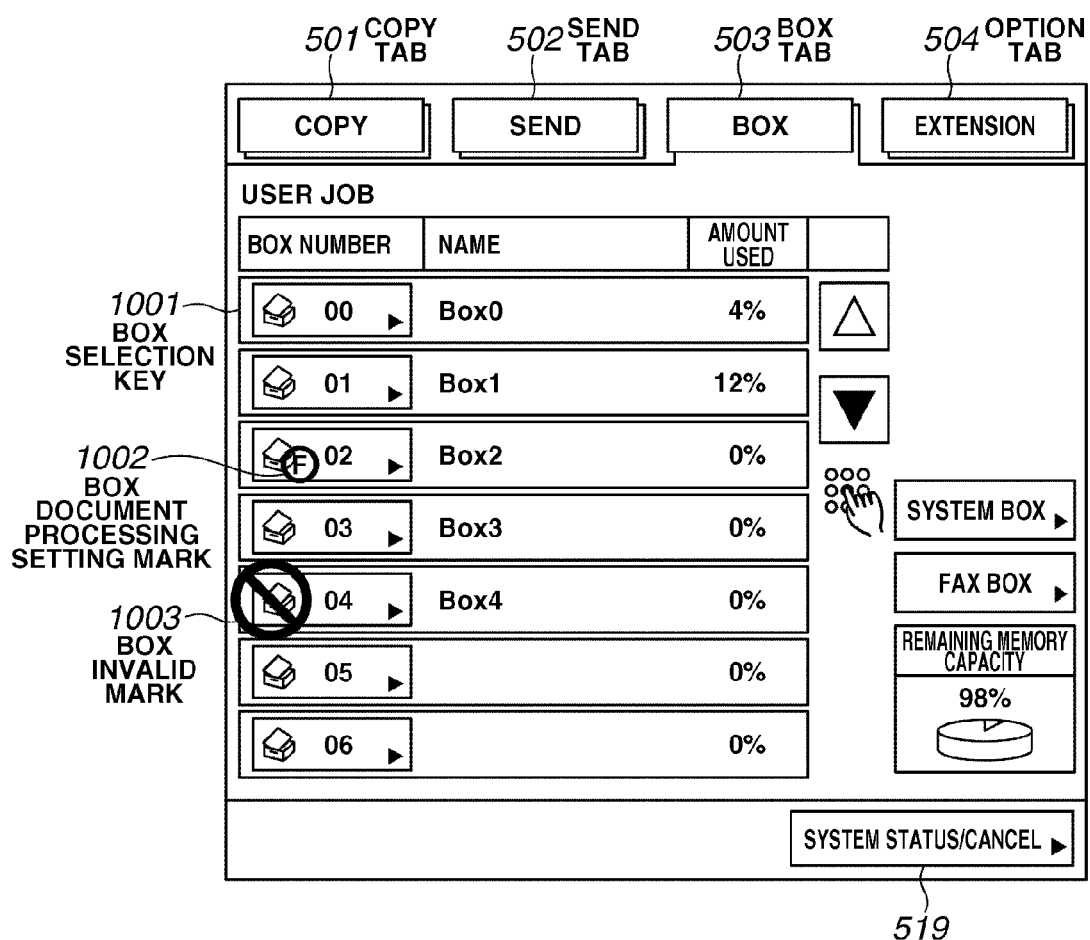
FIG. 10 illustrates an exemplary box operation screen displayed on the touch panel section of the operation unit of the image forming apparatus illustrated in FIG. 1.

FIG. 10 illustrates an exemplary box operation screen displayed on the touch panel section 301 of the operation unit 230 of the image forming apparatus 130 illustrated in FIG. 1. Items similar to those in FIG. 5 are denoted by the same reference numerals.

The box operation screen illustrated in FIG. 10 can be displayed when a user selects (presses) the box tab 503 in the touch panel section 301.

The screen displays a box list and includes a box selection key 1001 that enables a user to select a box as an operation target.

When a user operates the scanner 240 to read a paper document and stores electronic data of the read image into a box of the image forming apparatus 130, this screen enables a user to select an appropriate box (i.e., storage destination).

A box document processing setting mark 1002 indicates that the processing performed on a box document of this box can be automatically initiated.

A box invalid mark 1003 indicates that a box is in a waiting state until the processing for updating the box document processing setting file completes, if any document remains in a box when an update request of the box document processing setting file is received from the administrator.

Figure 11:
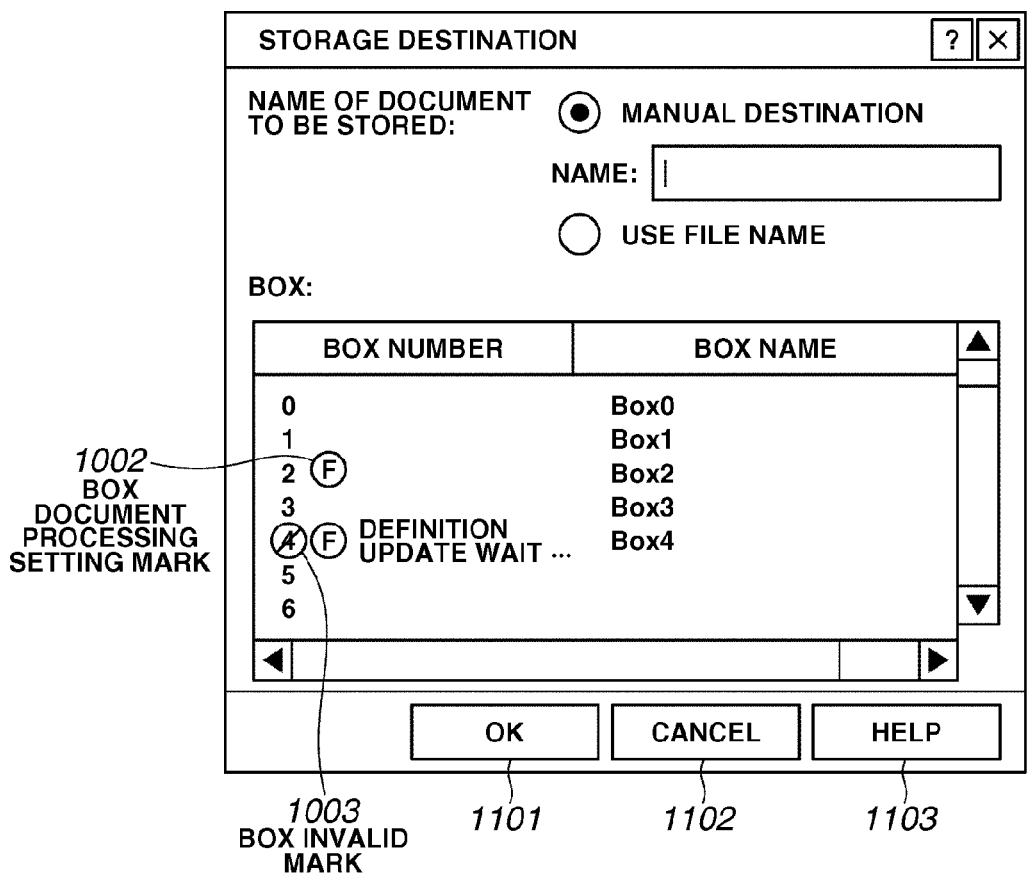
FIG. 11 illustrates an exemplary printing operation screen displayed on a display apparatus of a client personal computer (PC) illustrated in FIG. 1.

FIG. 11 illustrates an exemplary printing operation screen displayed on a display apparatus of the client PC 120 illustrated in FIG. 1. The exemplary operation screen illustrated in FIG. 11 can be used when a user stores a document into a box of the image forming apparatus 130 with a printer driver installed on the client PC 120.

The printing operation screen illustrated in FIG. 11 includes an OK button 1101 and a cancel button 1102 that enables a user to close the screen. When a user presses a help button 1103, help information relating to the screen is displayed.

Similar to the box operation screen illustrated in FIG. 10, the screen displays a list of boxes so that a user can select a box and press the OK button 1101 to designate a storage destination. When a printer driver of the client PC 120 converts a data format of the data so that the image forming apparatus 130 can interpret, a user can open this screen to select a storage destination from the box list.

This screen can be displayed when a user accesses a box list screen stored in the HDD 204 of the image forming apparatus 130 illustrated in FIG. 1. If a box of the image forming apparatus 130 stores a box document processing setting file, the box document processing setting mark 1002 is attached to this box.

The mark 1002 enables a user to know the presence of settings for automatically performing processing on the box document.

As described above, the box invalid mark 1003 is displayed if the box has been brought into a waiting state until the update of the file definition (i.e., the box document processing setting file) completes in response to an update request of the administrator.

More specifically, the data monitoring unit 274 determines whether the temporary information 284 stores any functional processing information that brings a box into a waiting state until the update of the file definition completes, or whether or not any specific functional processing information is set to a box. Then, the CPU 201 changes a display pattern of this box displayed on the operation unit 230 according to a state determined by the data monitoring unit 274. The exemplary display pattern is, for example, the box document processing setting mark 1002, the box invalid mark 1003, or no mark illustrated in FIG. 10.

As described above, the present embodiment prevents any new document from being stored into a box before the update of the file definition (i.e., the box document processing setting file) completes.

Thus, the present embodiment notifies to an update-target box not to accept a new document before completing the update of the file definition. Therefore, the present embodiment can prevent a document currently stored in a box from being subjected to any processing that a user of this document does not request or recognize.

Second Exemplary Embodiment

The second exemplary embodiment is different from the first exemplary embodiment in that an update notice (or warning) is transmitted to an owner user of a box document and completion of the update processing is notified to an administrative user.

Figure 12:
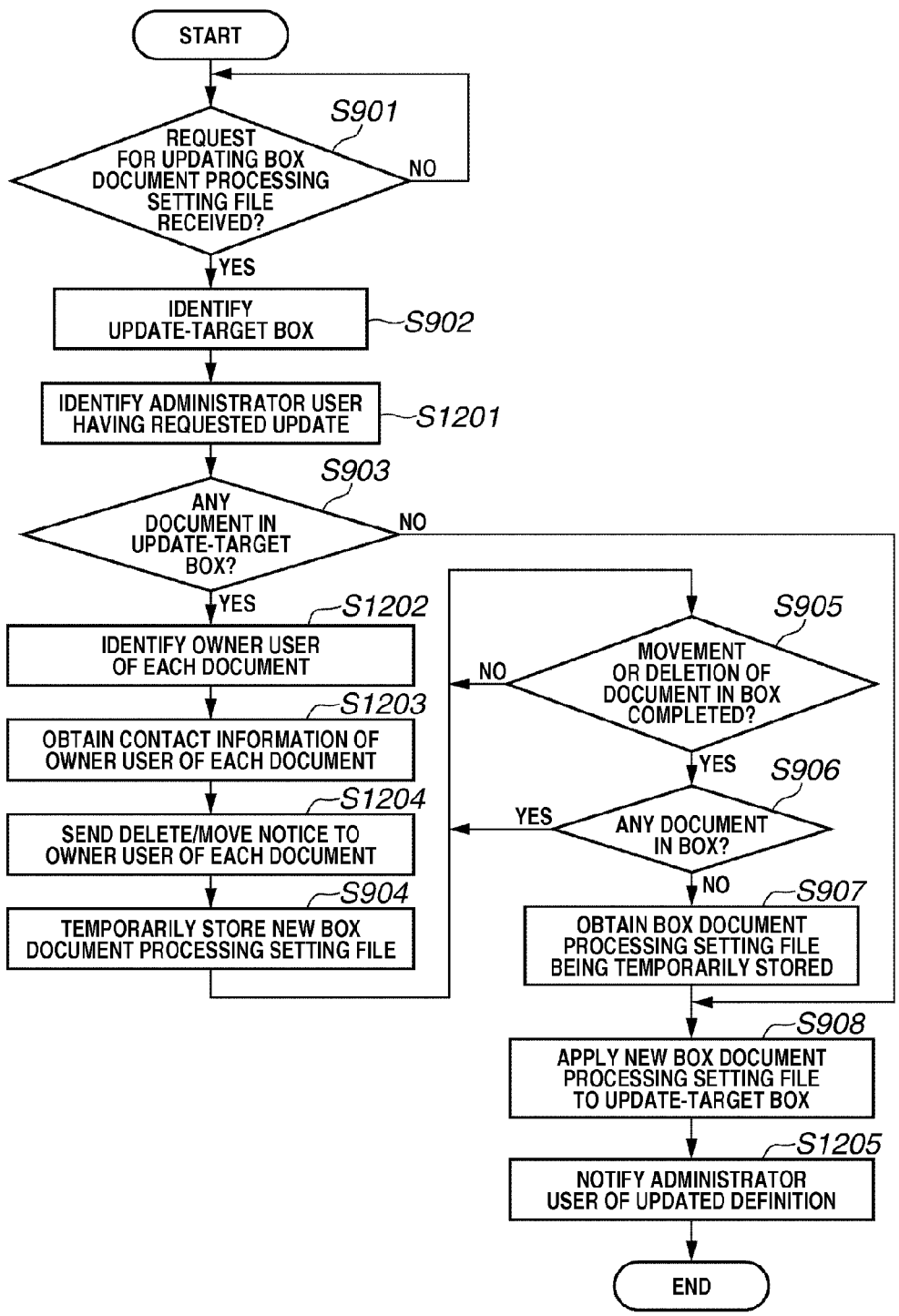
FIG. 12 is a flowchart illustrating an exemplary data processing procedure for the image forming apparatus of the present embodiment.

FIG. 12 is a flowchart illustrating an exemplary data processing procedure for the image forming apparatus of the present embodiment. The illustrated processing is for updating a box document processing setting file that can be set to a box in the HDD 204. The processing of each step can be realized by the CPU 201 that executes a control program loaded into the RAM 202 from the ROM 203 or the HDD 204, or downloaded from a host apparatus (not illustrated). The steps similar to those in FIG. 9 are denoted by the same step numbers.

In the present embodiment, it is presumed that a document A of user A and a document B of user B are input via the client PC 120 and stored in the Box 4 of the image forming apparatus 130.

First, if it is determined that an update request of the box document processing setting file has been received (YES in step S901), the processing flow proceeds to step S902. In step S902, the data analyzing unit 272 identifies an update-target box. Then, in step S1201, the processing request receiving unit 276 identifies an administrative user who has input an update request. If it is determined that any document remains in the update-target box (YES in step S903), the processing flow proceeds to step S1202. In step S1202, the data acquiring unit 273 obtains owner user information of each document which is stored previously.

FIG. 13 illustrates an exemplary document data management table TAB1 stored in the box document information 281 illustrated in FIG. 2B.

The document information in the table TAB1 includes a document ID 1301 (i.e., information identifying a document), a document name 1302, a box ID 1303 (i.e., information indicating a box as a storage destination), a user ID 1304 (i.e., information indicating an owner user), and an update date/time 1305.

In step S1202, the data acquiring unit 273 obtains the document ID 1301, the document name 1302, and the owner user ID 1304 of a document stored in the update-target box identified in step S902 with reference to the document data management table TAB1.

Figure 14:
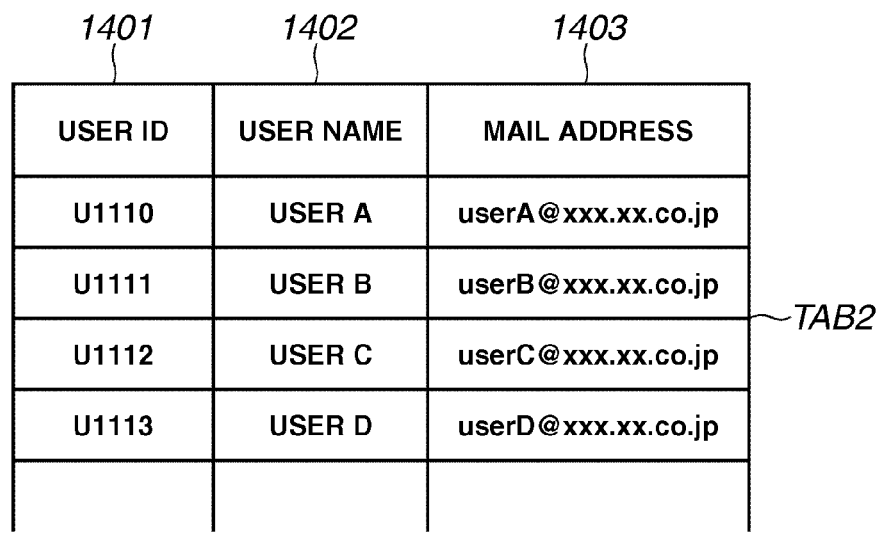
FIG. 14 illustrates an exemplary user information management table stored in user information illustrated in FIG. 2B.

In step S1203, the data acquiring unit 273 obtains mail address information (i.e., post information) relating to the owner user ID 1304 obtained in step S1202 with reference to a user information management table TAB2 illustrated in FIG. 14.

The user information management table TAB2 is involved in the user information 283 illustrated in FIG. 2B.

The user information management table TAB2 manages a user ID 1401, a user name 1402, and post information 1403 in association with each other. In the present embodiment, the post information 1403 is a mail address. However, the post information may be other information.

The user information management table TAB2 is present in the image forming apparatus 130. However, the user information management table TAB2 may be provided in the management server 110 or in any other image forming apparatus.

In short, according to the present embodiment, the user information is present somewhere in the system and the user information includes the post information of an owner user of a document.

In step S1204, the processing executing unit 275 generates and sends an electronic mail to the mail address obtained with reference to the user information management table TAB2.

The electronic mail includes box information and date/time of update request, together with a message "the box requires moving or deleting of your document to enable the update of the box document processing setting file." If necessary, the electronic mail can be enciphered. The electronic mail may include an icon that simply indicates mail information.

If a unique mail address is allocated to the image forming apparatus 130 beforehand, the mail address of the image forming apparatus 130 can be automatically set to the "From" field of the mail. It is also useful to automatically set the mail address of the administrative user identified in step S1201.

In step S904, the data registering unit 271 stores the new box document processing setting file (i.e., the file received together with the update request) and the administrative user information identified in step S1201 into the temporary information 284 of the information storing unit 280.

If all documents in the update-target box has been moved or deleted, and if the definition of the setting file has been updated in step S908, the processing flow proceeds to step S1205.

In step S1205, the processing executing unit 275 obtains the post information (i.e., mail address) of the administrative user identified in step S1201 and notifies completion of the processing for updating the definition of the setting file.

As described above, the present embodiment sends an update notice (warning) to an owner of a box document if any document remains in an update-target box. When the owner of a box document receives the update notice, it is expected that the box document is promptly moved or deleted. Thus, the image forming apparatus can quickly update the definition of the setting file.

Moreover, the present embodiment sends an update completion notice to the administrator when the definition of the setting file has been updated. Thus, the administrator can confirm the completion of the requested update processing without accessing the image forming apparatus.

Third Exemplary Embodiment

Unlike the above-described first and second exemplary embodiments, the third exemplary embodiment changes a display method of each box considering update effects of the file definition on each user.

More specifically, the present embodiment is different from the above-described first and second exemplary embodiments in the method for displaying a box list in the waiting state before the update of the file definition completes.

According to the present embodiment, when a user accesses the operation screen illustrated in FIG. 10 or FIG. 11, the image forming apparatus that the user accesses identifies the user and obtains user information. An exemplary user identifying unit performs user authentication. For example, the user identifying unit checks password information when a user inputs via the numeric keypad, reads an electronic tag, or reads an ID card.

The image forming apparatus 130 determines whether the identified user is an owner user of a document stored in an update-target box if the box is in the waiting state before update of the file definition completes. If the identified user is an owner user of the box document in the waiting state, the image forming apparatus 130 displays the box invalid mark 1003 as illustrated in FIGS. 10 and 11. Thus, the owner user can confirm that any box document processing setting is currently disabled.

Figure 15:
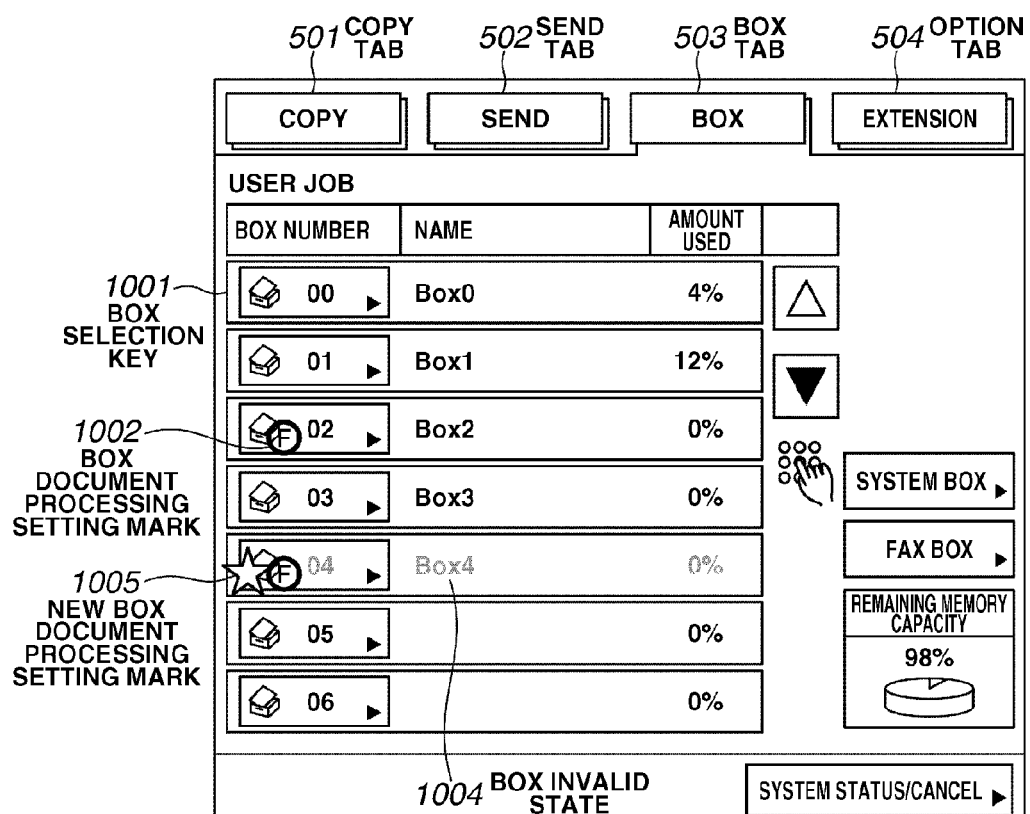
FIG. 15 illustrates an exemplary box operation screen displayed on the touch panel section of the operation unit of the image forming apparatus illustrated in FIG. 1.
Figure 16:
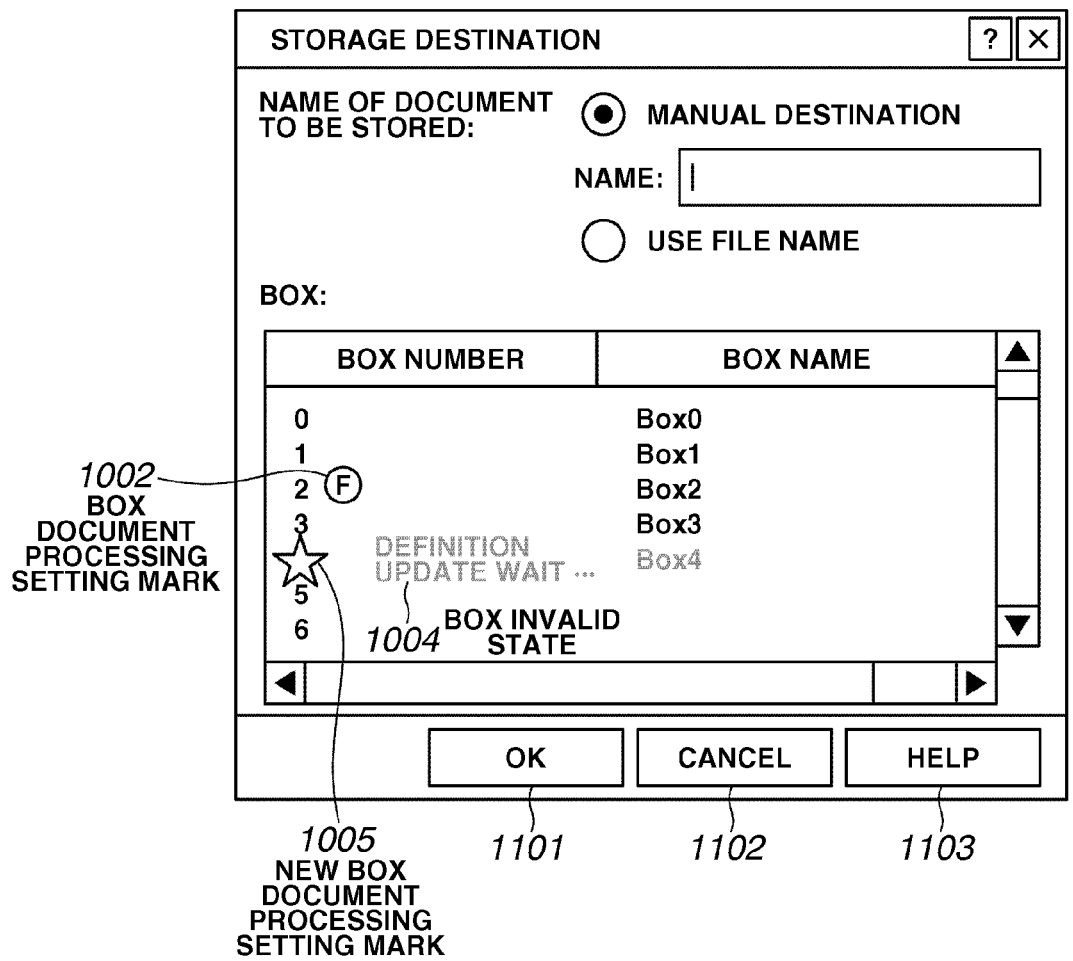
FIG. 16 illustrates an exemplary printing operation screen displayed on the display apparatus of the client PC illustrated in FIG. 1.

If the identified user is not the owner user of the box document, the image forming apparatus 130 displays a new box document processing setting mark 1005 illustrated in FIGS. 15 and 16.

FIG. 15 illustrates an exemplary box operation screen displayed on the touch panel section 301 of the operation unit 230 of the image forming apparatus 130 illustrated in FIG. 1. Items similar to those in FIG. 10 are denoted by the same reference numerals.

The box operation screen illustrated in FIG. 15 can be displayed when a user selects (presses) the box tab 503 in the touch panel section 301. This screen indicates that the update is performed with a new box document processing setting file.

Furthermore, the screen includes the display of a box invalid state 1004 that indicates a box is in the waiting state before the update of the file definition completes and cannot accept a new document. Thus, the new box document processing setting mark 1005 is attached to this box.

The user authentication can be performed according to the above-described method. If a user does not own a document in the update-target box (i.e., the box in the waiting state), an indication of the box invalid state 1004 is displayed to prevent any new document from being stored in this box.

FIG. 16 illustrates an exemplary printing operation screen displayed on the display apparatus of the client PC 120 illustrated in FIG. 1.

As illustrated in FIG. 16, if a box is in a waiting state before the update of the file definition completes and is currently unable to receive any new document, the client PC 120 displays an indication of the box invalid state 1004. Furthermore, the client PC 120 displays the new box document processing setting mark 1005 indicating that the box can receive no new document until the update of the file definition completes.

However, if accepting a new document is desirable, the box may not be invalidated. In this case, the present embodiment performs the display in a state where the new box document processing setting file is applied. If any new document is stored in the box, the present embodiment performs the processing on the new document according to the definition of the new box document processing setting file when the update of the file definition has been completed.

As described above, the present embodiment changes the display method of each box considering update effects of the file definition on each user. Thus, the present embodiment can effectively notify a user of an update state of the file definition.

Fourth Exemplary Embodiment

The fourth exemplary embodiment is different from the above-described second exemplary embodiment in that an update notice (warning) is transmitted to an administrative user if any document remains in an update-target box.

Figure 17:
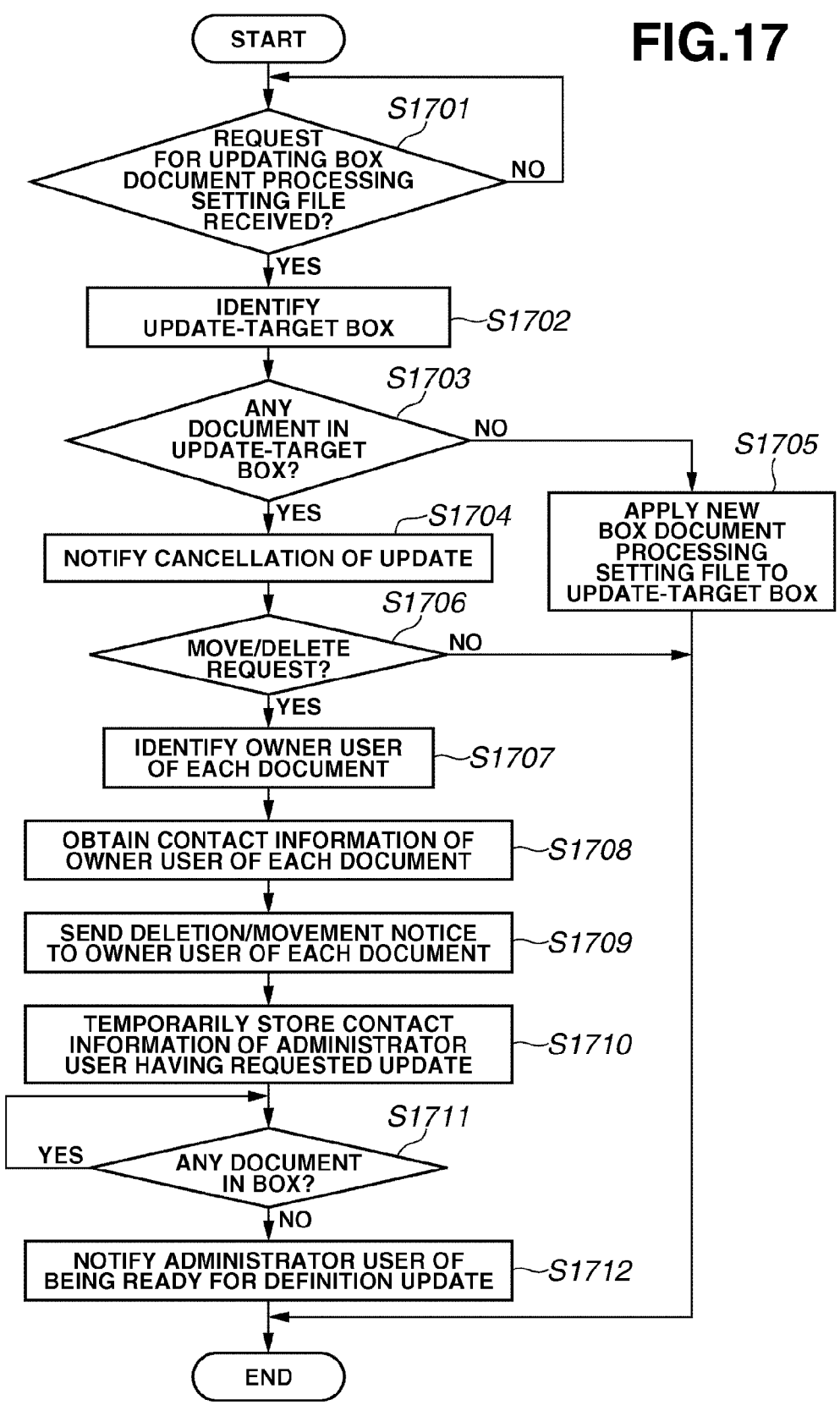
FIG. 17 is a flowchart illustrating an exemplary data processing procedure for the image forming apparatus of the present embodiment.

FIG. 17 is a flowchart illustrating an exemplary data processing procedure for the image forming apparatus of the present embodiment. The illustrated processing is for updating a box document processing setting file that can be set to a box in the HDD 204. The processing of each step can be realized by the CPU 201 that executes a control program loaded into the RAM 202 from the ROM 203 or the HDD 204, or downloaded from a host apparatus (not illustrated).

In the present embodiment, it is presumed that a document A of user A and a document B of user B are input via the client PC 120 and stored in the Box 4 of the image forming apparatus 130.

If the processing request receiving unit 276 of the data processing module 270 illustrated in FIG. 2B determines that an update request of the box document processing setting file is received from the administrative user (YES in step S1701), the processing flow proceeds to step S1702. In step S1702, the data analyzing unit 272 identifies an update-target box of the HDD 204. The box identification method in the present embodiment is similar to that described in the first exemplary embodiment.

In step S1703, the data acquiring unit 273 determines whether any document remains in the update-target box of the HDD 204 identified in step S1702. If it is determined that no document remains in the update-target box of the HDD 204 (NO in step S1703), the processing flow proceeds to step S1705. In step S1705, the data registering unit 271 applies a new box document processing setting file to the update-target box of the HDD 204 and terminates the processing of this routine.

If there is any document in the update-target box of the HDD 204 (YES in step S1703), the processing flow proceeds to step S1704. In step S1704, the processing executing unit 275 determines that the box document processing setting file cannot be immediately updated and notifies the administrative user of canceling the update of the file definition. The notification processing in the present embodiment is similar to that in the first exemplary embodiment.

In step S1706, it is determined whether the administrative user wants to notify the necessity of moving/deleting the document to an owner of the document in the update-target box of the HDD 204. If it is determined that a document move/delete request has been received from the administrative user, the processing request receiving unit 276 determines that the determination in step S1706 is YES. The processing flow proceeds to step S1707. If it is determined that the document move/delete request has not been received from the administrative user (NO in step S1706), the image forming apparatus terminates the processing of this routine.

In step S1707, the data acquiring unit 273 identifies an owner user of each document in the update-target box of the HDD 204. The owner identification method in the present embodiment is similar to that described in the first exemplary embodiment.

In step S1708, the data acquiring unit 273 obtains the post information of the owner user of each identified document from the user information 283. In step S1709, the processing executing unit 275 transmits a mail including a delete/move request to the owner user with reference to the obtained post information.

In this case, the processing executing unit 275 can obtain a mail address of the administrative user who has requested update of the box document processing setting file, and can set the obtained address to the "From" field of the mail transmitted in step S1709.

In step S1710, the data registering unit 271 stores the post information of the administrative user and the information of the update-target box into the temporary information 284.

In step S1711, the data monitoring unit 274 determines whether any document remains in the update-target box. The processing of step S1711 is performed periodically, or in response to detection of move/deletion of a document in the update-target box. If it is determined that there is no document remaining in the update-target box, the processing flow proceeds to step S1712. In step S1712, the processing executing unit 275 transmits a mail to the administrative user with reference to the information obtained in step S1710. Then, the processing executing unit 275 terminates the processing of this routine. The mail transmitted in step S1712 indicates that the box is ready for the update of the box document processing setting file.

As described above, the present embodiment sends a cancellation notice to the administrative user if any document remains in an update-target box which stores the box document processing setting file to be updated. The present embodiment can prevent a document currently stored in a box from being subjected to any processing that a user of this document does not request or recognize. Furthermore, if an administrator wants to quickly accomplish the update processing, the present embodiment requests an owner user of each box document to move or delete the document. Thus, the update work completes smoothly. Moreover, if the target box is ready to update, the present embodiment transmits an update-ready notice to the administrative user. Therefore, the administrative user can confirm the completion of the requested update processing without accessing the image forming apparatus.

Fifth Exemplary Embodiment

The fifth embodiment is different from the above-described fourth exemplary embodiment in that the administrative user sends a change-of-status notice to an owner user of each box document upon completing the processing for moving/deleting this document.

Figure 18:
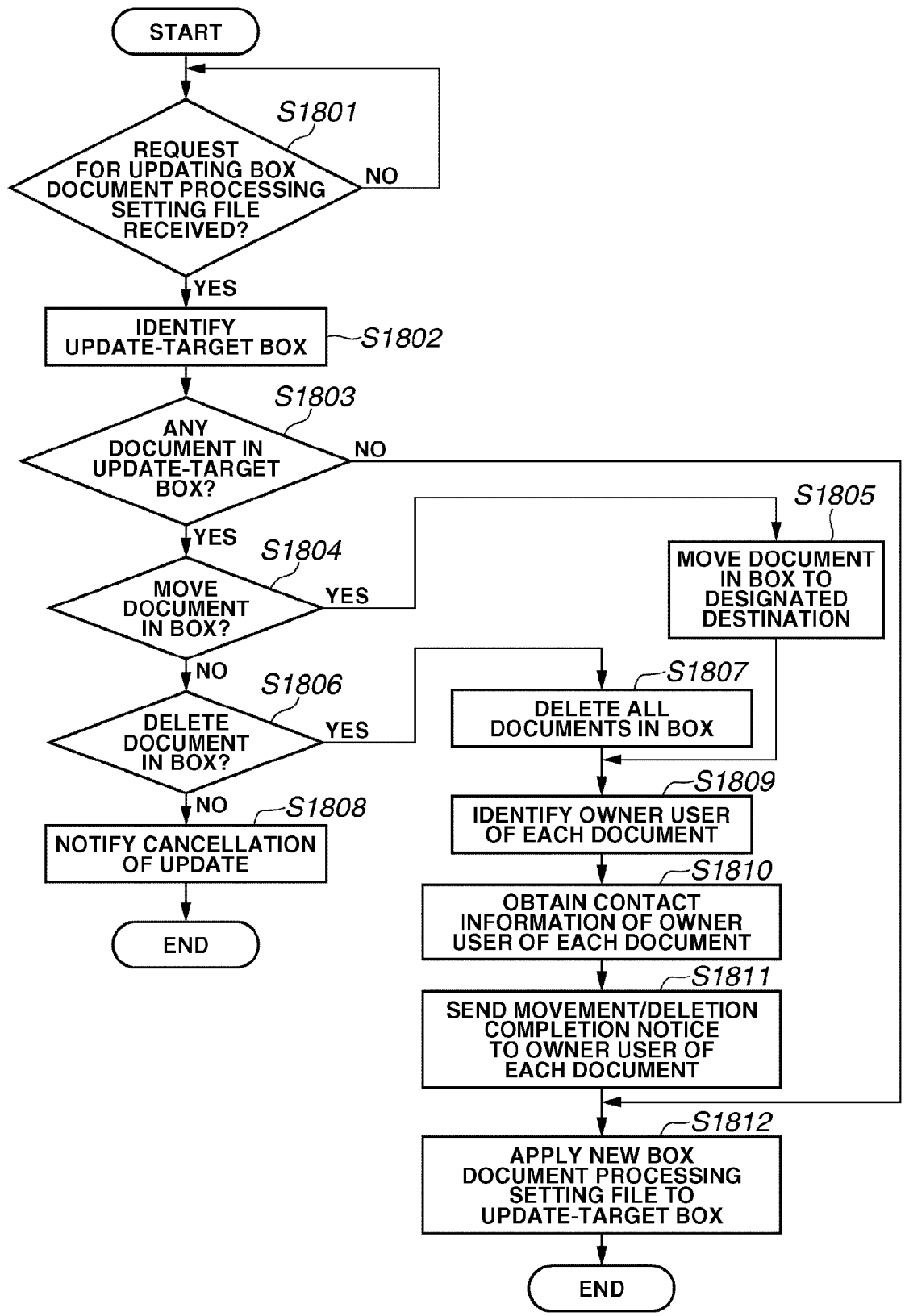
FIG. 18 is a flowchart illustrating an exemplary data processing procedure for the image forming apparatus of the present embodiment.

FIG. 18 is a flowchart illustrating an exemplary data processing procedure for the image forming apparatus of the present embodiment. The illustrated processing is for updating a box document processing setting file that can be set to a box in the HDD 204. The processing of each step can be realized by the CPU 201 that executes a control program loaded into the RAM 202 from the ROM 203 or the HDD 204, or downloaded from a host apparatus (not illustrated).

In the present embodiment, it is presumed that a document A of user A and a document B of user B are input via the client PC 120 and stored in the Box 4 of the image forming apparatus 130.

If the processing request receiving unit 276 determines that an update request of the box document processing setting file is received from the administrative user (YES in step S1801), the processing flow proceeds to step S1802. In step S1802, the data analyzing unit 272 identifies an update-target box. In step S1803, the data acquiring unit 273 determines whether any document remains in the update-target box identified in step S1802. If the data acquiring unit 273 determines that there is no document in the update-target box (NO in step S1803), the processing flow proceeds to step S1812. In step S1812, the data registering unit 271 applies a new box document processing setting file to the update-target box and terminates the processing of this routine.

If the data acquiring unit 273 determines that there is a document in the update-target box (YES in step S1803), the processing flow proceeds to step S1804. In step S1804, the processing request receiving unit 276 determines whether the request from the administrator is a document move request (i.e., whether the administrator requests moving the document from the update-target box to other box). If the processing request receiving unit 276 determines that the request from the administrator is the document move request (YES in step S1804), the processing flow proceeds to step S1805. In step S1805, the processing executing unit 275 moves all documents from the update-target box to other box being designated as a destination by the administrator. The processing flow proceeds to step S1809.

If the processing request receiving unit 276 determines that the request from the administrator is not the document move request (NO in step S1804), the processing flow proceeds to step S1806.

In step S1806, the processing request receiving unit 276 determines whether the request from the administrator is a document delete request (i.e., whether the administrator requests deleting the document stored in the update-target box). If the processing request receiving unit 276 determines that the request from the administrator is not the document delete request (NO in step S1806), the processing flow proceeds to step S1808. In step S1808, the processing executing unit 275 notifies the administrator of canceling the update of the requested box document processing setting file, and terminates the processing of this routine.

As apparent from the foregoing description, if it is determined that any data remains in a box, the present embodiment sends an update cancellation notice to an update requester (i.e., administrator) based on management information. The update cancellation notice indicates that specific functional processing information stored in the box cannot be replaced with new functional processing information. FIGS. 13 and 14 illustrate exemplary management information.

If the processing request receiving unit 276 determines that the request from the administrator is the document delete request (YES in step S1806), the processing flow proceeds to step S1807. In step S1807, the processing executing unit 275 deletes all documents in the update-target box. The processing flow proceeds to step S1809.

In step S1809, the data acquiring unit 273 identifies an owner user of each document in the update-target box which has been moved in step S1805 or deleted in step S1807. In step S1810, the data acquiring unit 273 obtains a mail address of the owner user of each identified document from the user information 283.

In step S1811, the processing executing unit 275 generates a mail notifying that the box document has been moved/deleted for the update of the box document processing setting file and transmits the mail to the obtained mail address. In step S1812, the data registering unit 271 applies new box document processing setting file to the update-target box and terminates the processing of this routine.

As described above, if new functional processing information is stored in the temporary information 284, the present embodiment determines whether any data remains in the update-target box that stores specific functional processing information in step S1803. Then, if it is determined that any data remains an update-target box, the present embodiment performs specific processing on all data remaining in the box in steps S1805 and S1807 to bring the update-target box into a state ready for storing the new functional processing information.

The specific processing is, for example, moving all data stored in the box to other box or deleting the data. The present embodiment transmits a change-of-status notice to an owner of each data based on the management information in step S1811. The change-of-status notice indicates the contents of the specific processing having been executed. FIGS. 13 and 14 illustrate exemplary management information.

According to the present embodiment, an owner user of a box document can be quickly informed if the administrator has moved or deleted the document. As a result, a new document can be speedily stored into a box.

As described above, the present embodiment moves or deletes any data remaining in an update-target box before an administrator executes the update of a box document processing setting file. Thus, the present embodiment can prevent a box document from being subjected to any processing that is not requested or recognized by an owner user of this document.

Sixth Exemplary Embodiment

FIG. 19 illustrates a memory map of a storage medium that stores various data processing programs, which are readable by the image forming apparatus of the exemplary embodiments of the present invention.

Although not illustrated in the drawings, the storage medium can store management information for the programs stored in the storage medium, version information, creator name, and information relevant to the OS that reads the programs, e.g., icons discriminately displaying the programs.

Furthermore, a directory of the storage medium can manage data belonging to various programs. Moreover, the storage medium can store a program for installing various programs on a computer and a decompression program if the installed program is compressed.

A host apparatus computer can install and execute program (s) that realize the functions of the processing illustrated in FIGS. 9, 12, 17, and 18. In this case, information including the program(s) can be supplied to an output apparatus with an appropriate portable medium such as a compact disk-ROM, a flash memory or a flexible desk, or via a network, from an external storage medium.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers or ftp servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-235998 filed Aug. 31, 2006, which is hereby incorporated by reference herein in its entirety.

What is claimed is:

1. An image forming apparatus configured to manage a plurality of storage units for storing document data therein and to perform on the document data stored in the storage unit, a functional process that is described in functional processing information set to the storage unit, comprising:
   a receiving unit configured to receive a request of setting new functional processing information for performing the new functional process on the document data stored in the storage unit that is to replace specific functional processing information set to the storage unit,
   wherein each of the plurality of storage units has a unique functional process set to it, and
   wherein the new functional processing information includes an execution timing for performing on the document data stored in the storage unit, the new functional process set to the storage unit;
   a determination unit configured to determine whether any document data remains in the storage unit to which the specific functional processing information is set when the receiving unit receives the request of setting the new functional processing information; and
   an updating unit configured to wait until the determination unit determines that no document data remains in the storage unit while preventing the specific functional processing information stored in the storage unit from being updated based on the new functional processing information if the determination unit determines that any document data remains in the storage unit, and replace the specific functional processing information set to the storage unit with the new functional processing information when the determination unit determines that no document data remains in the storage unit.

2. The image forming apparatus according to claim 1, further comprising a holding unit configured to hold the new functional processing information until the document data in the storage unit is completely moved or deleted if the determination unit determines that any document data remains in the storage unit,
   wherein the updating unit updates the specific functional processing information set to the storage unit based on the new functional processing information held in the holding unit if the determination unit determines that no document data remains in the storage unit.

3. The image forming apparatus according to claim 2, further comprising:
   a state determination unit configured to determine whether the storage unit is in an update waiting state, whether the specific functional processing information is set to the storage unit, or whether no specific functional processing information is set to the storage unit, based on the functional processing information held by the holding unit; and
   a display control unit configured to change a display pattern of the storage unit displayed on a display unit according to a state determined by the state determination unit.

4. The image forming apparatus according to claim 1, further comprising:
   a management information holding unit configured to hold management information of the document data stored in the storage unit, and a notification unit configured to transmit a request to an owner of the document data based on the management information, if the determination unit determines that any document data remains in the storage unit, so that the owner can change the storage unit into a state ready for receiving the new functional processing information.

5. The image forming apparatus according to claim 4, wherein the notification unit requests the owner of the document data to move or delete all data remaining in the storage unit so that the owner can change the storage unit into a state ready for receiving the new functional processing information.

6. The image forming apparatus according to claim 4, wherein the notification unit generates an update-ready notice when all document data stored in the storage unit has been completely moved to other storage unit or deleted.

7. The image forming apparatus according to claim 4, wherein the notification unit generates an update completion notice when the new functional processing information is set to the storage unit.

8. A method for an image forming apparatus configured to manage a plurality of storage units for storing document data therein and to perform on the document data stored in the storage unit, a functional process that is described in functional processing information set to the storage unit, the method comprising:
   receiving a request of setting new functional processing information for performing the new functional process on the document data stored in the storage unit that is to replace specific functional processing information set to the storage,
   wherein each of the plurality of storage units has a unique functional process set to it, and
   wherein the new functional processing information includes the execution timing for performing on the document data stored in the storage unit, the new functional process set to the storage unit;
   determining whether any document data remains in the storage unit to which the specific functional processing information is set, when the request of setting new functional processing information is received;
   preventing, while waiting until a determination is made that no document data remains in the storage, the specific functional processing information stored in the storage unit from being updated based on the new functional processing information if it is determined that any document data remains in the storage unit; and
   updating the specific functional processing information set to the storage unit based on the new functional processing information when it is determined that no document data remains in the storage unit.

9. The method according to claim 8, further comprising:
   holding the new functional processing information until the document data in the storage unit is completely moved or deleted if it is determined that any document data remains in the storage unit; and
   updating the specific functional processing information set to the storage unit based on the new functional processing information when it is determined that no document data remains in the storage unit.

10. The method according to claim 9, further comprising:
   determining whether the storage unit is in an update waiting state, whether the specific functional processing information is set to the storage unit, or whether no specific functional processing information is set to the storage unit, based on the functional processing information held; and
   changing a display pattern of the storage unit displayed on a display unit according to a determined state.

11. The method according to claim 8, further comprising transmitting a request to an owner of the document data based on management information of the document data stored in the storage unit, if it is determined that any document data remains in the storage unit, so that the owner can change the storage unit into a state ready for receiving the new functional processing information.

12. The method according to claim 11, further comprising requesting the owner of the document data to move to other storage unit or delete, all data remaining in the storage unit based on the management information so that the owner can change the storage unit into a state ready for receiving the new functional processing information.

13. The method according to claim 11, further comprising generating an update-ready notice when all document data stored in the storage unit has been completely moved to the other storage unit or deleted.

14. The method according to claim 11, further comprising generating an update completion notice when the new functional processing information is set to the storage unit.

15. A non-transitory computer readable medium storing instructions for controlling an image forming apparatus configured to manage a plurality of storage units for storing document data therein and to perform on the document data stored in the storage unit, a functional process that is described in functional processing information set to the storage unit, the medium comprising:
   computer-executable instructions for receiving a request of setting new functional processing information for performing the new functional process on the document data stored in the storage unit that is to replace specific functional processing information set to the storage,
   wherein each of the plurality of storage units has a unique functional process set to it, and
   wherein the new functional processing information includes an execution timing for performing on the document data stored in the storage unit, the new functional process set to the storage unit;
   computer-executable instructions for determining whether any document data remains in the storage unit to which the specific functional processing information is set, when the request of setting new functional processing information is received;
   computer-executable instructions for preventing, while waiting until a determination is made that no document data remains in the storage, the specific functional processing information stored in the storage unit from being updated based on the new functional processing information if it is determined that any document data remains in the storage unit; and
   computer-executable instructions for updating the specific functional processing information set to the storage unit based on the new functional processing information when it is determined that no document data remains in the storage unit.

* * * * *